United States Patent
Barfuss et al.

(10) Patent No.: US 10,201,039 B2
(45) Date of Patent: Feb. 5, 2019

(54) FELT HEATER AND METHOD OF MAKING

(71) Applicant: W.E.T. AUTOMOTIVE SYSTEMS, LTD., Windsor (CA)

(72) Inventors: Jack Barfuss, Windsor (CA); Matt Zuzga, Macomb, MI (US); Syed Rafat Iqbal, Windsor (CA)

(73) Assignee: GENTHERM GMBH, Odelzhausen (DE)

( * ) Notice: Subject to any disclaimer, the term of this patent is extended or adjusted under 35 U.S.C. 154(b) by 1271 days.

(21) Appl. No.: 13/737,590

(22) Filed: Jan. 9, 2013

(65) Prior Publication Data
US 2013/0186884 A1    Jul. 25, 2013

Related U.S. Application Data

(60) Provisional application No. 61/588,952, filed on Jan. 20, 2012.

(51) Int. Cl.
| | |
|---|---|
| H05B 3/34 | (2006.01) |
| H05B 3/00 | (2006.01) |
| B23P 11/00 | (2006.01) |
| H01C 17/065 | (2006.01) |

(52) U.S. Cl.
CPC .......... *H05B 3/0004* (2013.01); *B23P 11/00* (2013.01); *H01C 17/0652* (2013.01); *H01C 17/06586* (2013.01); *H05B 3/342* (2013.01); *H05B 2203/029* (2013.01); *Y10T 29/49826* (2015.01)

(58) Field of Classification Search
CPC .................. H05B 3/0004; H05B 3/342; H05B 2203/029; B23P 11/00; H01C 17/0652; H01C 17/06586; Y10T 29/49826

USPC ....... 219/529, 202, 217, 552, 544, 548, 211, 219/212, 213, 527, 528, 549, 543, 545; 29/611, 620
See application file for complete search history.

(56) References Cited

U.S. PATENT DOCUMENTS

| | | |
|---|---|---|
| 1,475,912 A | 11/1923 | Williams |
| 1,553,461 A | 9/1925 | Negromanti |

(Continued)

FOREIGN PATENT DOCUMENTS

| | | |
|---|---|---|
| DE | 3513909 | 10/1986 |
| DE | 3938951 A1 | 5/1990 |

(Continued)

OTHER PUBLICATIONS

Potentially related U.S. Appl. No. 13/256,318, published as 2013/0106147 on May 2, 2013.

(Continued)

*Primary Examiner* — Dana Ross
*Assistant Examiner* — Ket D Dang
(74) *Attorney, Agent, or Firm* — Daniel P. Aleksynas; The Dobrusin Law Firm, P.C.

(57) ABSTRACT

A heater comprising: (a) a non-woven heating layer having: a forward surface, a rearward surface, and a plurality of edges around a periphery of the heating layer; (b) two or more connections to a power source; wherein the heating layer is made up of a plurality of individual fibers that are randomly oriented; and wherein substantially all of the non-woven heating layer produces heat when power is to the non-woven heating layer.

19 Claims, 6 Drawing Sheets

(56) References Cited

U.S. PATENT DOCUMENTS

| | | | |
|---|---|---|---|
| 2,262,336 A * | 11/1941 | Samuels | H05B 3/342 |
| | | | 219/529 |
| 2,409,421 A | 10/1946 | Dufault | |
| 2,978,972 A | 4/1961 | Hake | |
| 3,014,117 A | 12/1961 | Mading | |
| 3,221,145 A | 11/1965 | Hager | |
| 3,287,684 A | 11/1966 | Armbruster | |
| 3,448,246 A | 6/1969 | Armbruster | |
| 3,500,014 A | 3/1970 | Longo | |
| 3,721,799 A | 3/1973 | Carlstrom | |
| 3,877,788 A | 4/1975 | Sprague et al. | |
| 3,892,946 A | 7/1975 | Rimmi | |
| 4,032,752 A | 6/1977 | Ohmura et al. | |
| 4,044,221 A | 8/1977 | Kuhn | |
| 4,149,066 A | 4/1979 | Niibe | |
| 4,245,149 A | 1/1981 | Fairlie | |
| 4,247,756 A | 1/1981 | Cucinotta et al. | |
| 4,335,725 A | 6/1982 | Geldmacher | |
| 4,399,347 A | 8/1983 | Schmitt | |
| 4,410,790 A | 10/1983 | Berf et al. | |
| 4,436,986 A | 3/1984 | Carlson | |
| 4,523,085 A | 6/1985 | Grise | |
| 4,533,821 A | 8/1985 | Sato | |
| 4,539,051 A | 9/1985 | Hacias | |
| 4,542,285 A | 9/1985 | Grise | |
| 4,626,664 A | 12/1986 | Grise | |
| 4,628,187 A | 12/1986 | Sekiguchi et al. | |
| 4,628,188 A | 12/1986 | Andreasson | |
| 4,633,068 A | 12/1986 | Grise | |
| 4,656,339 A | 4/1987 | Grise | |
| 4,661,689 A | 4/1987 | Harrison | |
| 4,665,304 A | 5/1987 | Spencer | |
| 4,695,091 A | 9/1987 | Altmann et al. | |
| 4,719,335 A | 1/1988 | Batliwalla et al. | |
| 4,725,717 A | 2/1988 | Harrison | |
| 4,731,531 A | 3/1988 | Handke | |
| 4,743,741 A | 5/1988 | Ramus | |
| 4,752,672 A | 6/1988 | Grise | |
| 4,761,541 A | 8/1988 | Batliwalla et al. | |
| 4,777,351 A | 10/1988 | Batliwalla et al. | |
| 4,845,343 A | 7/1989 | Aune et al. | |
| 4,849,255 A | 7/1989 | Grise et al. | |
| 4,857,711 A | 8/1989 | Watts | |
| 4,868,898 A | 9/1989 | Seto | |
| 4,888,089 A | 12/1989 | Marstiller et al. | |
| 4,892,998 A | 1/1990 | Marstiller et al. | |
| 4,912,306 A | 3/1990 | Grise et al. | |
| 4,923,248 A | 5/1990 | Feher | |
| 4,931,627 A | 6/1990 | Watts | |
| 4,952,776 A | 8/1990 | Huguet | |
| 4,964,674 A | 10/1990 | Wetmann et al. | |
| 5,015,824 A | 5/1991 | Monter et al. | |
| 5,019,797 A | 5/1991 | Marstiller et al. | |
| 5,025,136 A | 6/1991 | Doege et al. | |
| 5,034,594 A | 7/1991 | Beezhold et al. | |
| 5,045,673 A | 9/1991 | Kelly | |
| 5,057,674 A | 10/1991 | Smith-Johannsen | |
| 5,081,339 A | 1/1992 | Stine | |
| 5,111,025 A | 5/1992 | Barma et al. | |
| 5,132,840 A | 7/1992 | Okada et al. | |
| 5,155,334 A | 10/1992 | Marstiller et al. | |
| 5,181,006 A | 1/1993 | Shafe et al. | |
| 5,187,350 A | 2/1993 | Tsuchiya | |
| 5,197,595 A | 3/1993 | Coultas | |
| 5,198,639 A | 3/1993 | Smuckler | |
| 5,206,482 A | 4/1993 | Smuckler | |
| 5,335,381 A | 8/1994 | Chang | |
| 5,344,591 A | 9/1994 | Smuckler | |
| 5,354,966 A | 10/1994 | Sperbeck | |
| 5,405,178 A | 4/1995 | Weingarten et al. | |
| 5,414,241 A | 5/1995 | Oshashi et al. | |
| 5,418,025 A | 5/1995 | Harmand et al. | |
| 5,422,462 A | 6/1995 | Kishimoto | |
| 5,432,322 A | 7/1995 | Ingram et al. | |
| 5,451,747 A | 9/1995 | Sullivan et al. | |
| 5,477,033 A | 12/1995 | Bergholtz | |
| 5,516,189 A | 5/1996 | Ligeras | |
| 5,543,601 A | 8/1996 | Bartrug et al. | |
| 5,626,021 A | 5/1997 | Karunasiri et al. | |
| 5,643,480 A | 7/1997 | Gustavsson et al. | |
| 5,679,277 A | 10/1997 | Niibe et al. | |
| 5,702,565 A | 12/1997 | Wu et al. | |
| 5,716,536 A | 2/1998 | Yokoto et al. | |
| 5,796,044 A | 8/1998 | Cobian et al. | |
| 5,800,483 A | 9/1998 | Vought | |
| 5,800,595 A | 9/1998 | Wright | |
| 5,801,914 A | 9/1998 | Thrash | |
| 5,824,993 A | 10/1998 | Chrysochoos et al. | |
| 5,824,994 A | 10/1998 | Noda et al. | |
| 5,824,996 A | 10/1998 | Kochman et al. | |
| 5,851,588 A | 12/1998 | Uthoff, Jr. | |
| 5,861,610 A | 1/1999 | Weiss | |
| 5,897,162 A | 4/1999 | Humes et al. | |
| 5,902,505 A | 5/1999 | Finley | |
| 5,904,874 A | 5/1999 | Winter | |
| 5,921,314 A | 7/1999 | Schuller et al. | |
| 5,935,474 A | 8/1999 | Grischenkov et al. | |
| 5,948,297 A | 9/1999 | Haubner et al. | |
| 5,961,869 A | 10/1999 | Irgens | |
| 6,031,214 A | 2/2000 | Bost et al. | |
| 6,054,690 A | 4/2000 | Petit et al. | |
| 6,057,530 A | 5/2000 | Gurevich | |
| 6,064,037 A | 5/2000 | Weiss et al. | |
| 6,070,115 A | 5/2000 | Oestreicher et al. | |
| 6,084,217 A | 7/2000 | Bulgajewski | |
| 6,093,908 A | 7/2000 | Haag | |
| 6,093,910 A | 7/2000 | McClintock et al. | |
| 6,097,009 A | 8/2000 | Cole | |
| 6,111,234 A | 8/2000 | Batliwalla et al. | |
| 6,124,577 A | 9/2000 | Fristedt | |
| 6,143,206 A | 11/2000 | Handa et al. | |
| 6,147,332 A | 11/2000 | Holmberg et al. | |
| 6,150,642 A | 11/2000 | Weiss et al. | |
| 6,164,719 A | 12/2000 | Rauh | |
| 6,172,344 B1 * | 1/2001 | Gordon | H05B 3/34 |
| | | | 219/497 |
| 6,189,487 B1 | 2/2001 | Owen et al. | |
| 6,194,692 B1 * | 2/2001 | Oberle | H05B 3/34 |
| | | | 219/528 |
| 6,215,111 B1 | 4/2001 | Rock et al. | |
| 6,220,659 B1 | 4/2001 | McDowell et al. | |
| 6,229,123 B1 | 5/2001 | Kochman et al. | |
| 6,278,090 B1 | 8/2001 | Fristedt et al. | |
| 6,294,758 B1 | 9/2001 | Masao et al. | |
| 6,307,188 B1 | 10/2001 | Bulgajewski | |
| 6,369,369 B2 | 4/2002 | Kochman et al. | |
| 6,415,501 B1 | 7/2002 | Schlesselman | |
| 6,423,951 B1 | 7/2002 | Elsasser | |
| 6,426,485 B1 | 7/2002 | Bulgajewski et al. | |
| 6,439,658 B1 | 8/2002 | Ganz et al. | |
| 6,452,138 B1 | 9/2002 | Kochman et al. | |
| 6,455,823 B1 | 9/2002 | Bulgajewski et al. | |
| 6,483,087 B2 | 11/2002 | Gardner et al. | |
| 6,495,809 B2 | 12/2002 | Bulgajewski et al. | |
| 6,501,055 B2 | 12/2002 | Rock et al. | |
| 6,512,202 B2 | 1/2003 | Haag et al. | |
| 6,512,203 B2 | 1/2003 | Jones et al. | |
| 6,559,422 B2 | 5/2003 | Burt | |
| RE38,128 E | 6/2003 | Gallup et al. | |
| 6,619,736 B2 | 9/2003 | Stowe et al. | |
| 6,629,724 B2 | 10/2003 | Ekern et al. | |
| 6,664,512 B2 | 12/2003 | Horey et al. | |
| 6,664,518 B2 | 12/2003 | Fristedt et al. | |
| 6,676,207 B2 | 1/2004 | Rauh et al. | |
| 6,686,562 B1 | 2/2004 | Weiss et al. | |
| 6,710,303 B1 | 3/2004 | Lorenzen | |
| 6,713,733 B2 | 3/2004 | Kochman et al. | |
| 6,814,889 B1 | 11/2004 | O'Grady et al. | |
| 6,838,647 B2 | 1/2005 | Nagele | |
| 6,840,576 B2 | 1/2005 | Ekern et al. | |
| 6,857,697 B2 | 2/2005 | Brennan et al. | |
| 6,869,139 B2 | 3/2005 | Brennan et al. | |
| 6,869,140 B2 | 3/2005 | White et al. | |
| 6,872,882 B2 | 3/2005 | Fritz | |

(56) References Cited

U.S. PATENT DOCUMENTS

| | | |
|---|---|---|
| 6,884,965 B2 | 4/2005 | Nelson et al. |
| 6,892,807 B2 | 5/2005 | Fristedt et al. |
| 6,893,086 B2 | 5/2005 | Bajic et al. |
| 6,906,293 B2 | 6/2005 | Schmiz et al. |
| 6,974,935 B2 | 12/2005 | O'Grady |
| 6,976,734 B2 | 12/2005 | Stoewe |
| 7,019,260 B1 | 3/2006 | Degand et al. |
| 7,020,420 B2 | 3/2006 | Berg et al. |
| 7,036,283 B2 | 5/2006 | Halas |
| 7,040,710 B2 | 5/2006 | White et al. |
| 7,052,091 B2 | 5/2006 | Bajic et al. |
| 7,053,344 B1 | 5/2006 | Surjan et al. |
| 7,083,227 B2 | 8/2006 | Brennan et al. |
| 7,100,978 B2 | 9/2006 | Ekern et al. |
| 7,131,689 B2 | 11/2006 | Brennan et al. |
| 7,147,279 B2 | 12/2006 | Bevan et al. |
| 7,168,758 B2 | 1/2007 | Bevan et al. |
| 7,202,444 B2 | 4/2007 | Bulgajewski |
| 7,205,510 B2 | 4/2007 | Howick |
| 7,213,876 B2 | 5/2007 | Stoewe |
| 7,223,948 B2 | 5/2007 | Howick et al. |
| 7,285,748 B2 | 10/2007 | Nelson et al. |
| 7,291,815 B2 * | 11/2007 | Hubert ............... B64D 15/12 219/529 |
| 7,301,441 B2 | 11/2007 | Inada et al. |
| 7,306,283 B2 | 12/2007 | Howick et al. |
| 7,338,117 B2 | 3/2008 | Iqbal et al. |
| 7,356,912 B2 | 4/2008 | Iqbal et al. |
| 7,370,911 B2 | 5/2008 | Bajic et al. |
| 7,475,938 B2 | 1/2009 | Stoewe et al. |
| 7,478,869 B2 | 1/2009 | Lazanja et al. |
| 7,500,536 B2 | 3/2009 | Bulgajewski et al. |
| 7,506,938 B2 | 3/2009 | Brennan et al. |
| 7,510,239 B2 | 3/2009 | Stowe |
| 7,560,670 B2 | 7/2009 | Lorenzen et al. |
| 7,569,795 B2 | 8/2009 | Ferguson |
| 7,587,901 B2 | 9/2009 | Petrovski |
| 7,618,089 B2 | 11/2009 | Stoewe et al. |
| 7,637,569 B2 | 12/2009 | Krobok et al. |
| 7,663,076 B2 | 2/2010 | Tarry |
| 7,741,582 B2 | 6/2010 | Howick et al. |
| 7,838,804 B2 | 10/2010 | Krobok |
| 8,283,602 B2 * | 10/2012 | Augustine ............. H05B 3/342 219/211 |
| 2001/0002669 A1 * | 6/2001 | Kochman ........... A41D 13/0051 219/545 |
| 2002/0117495 A1 | 8/2002 | Kochman et al. |
| 2002/0153368 A1 * | 10/2002 | Gardner ................. B29C 70/82 219/545 |
| 2003/0111454 A1 | 6/2003 | Ishiyama et al. |
| 2003/0155347 A1 | 8/2003 | Oh et al. |
| 2003/0199947 A1 * | 10/2003 | Gardner ................. B29C 70/82 607/96 |
| 2004/0021346 A1 | 2/2004 | Morinet et al. |
| 2004/0055699 A1 * | 3/2004 | Smith ................... B29C 65/344 156/273.9 |
| 2004/0065656 A1 | 4/2004 | Inagawa et al. |
| 2004/0100131 A1 | 5/2004 | Howick et al. |
| 2004/0144197 A1 | 7/2004 | O'Grady |
| 2004/0211772 A1 | 10/2004 | Park |
| 2005/0077287 A1 | 4/2005 | O'Grady |
| 2005/0115956 A1 | 6/2005 | Wong |
| 2005/0242081 A1 | 11/2005 | Howick |
| 2006/0015801 A1 | 1/2006 | Suh et al. |
| 2006/0138810 A1 | 6/2006 | Knoll et al. |
| 2006/0158011 A1 | 7/2006 | Marlovits et al. |
| 2006/0278631 A1 * | 12/2006 | Lee ..................... H05B 3/342 219/529 |
| 2007/0176471 A1 | 8/2007 | Knoll |
| 2007/0278210 A1 | 12/2007 | Weiss |
| 2008/0011732 A1 | 1/2008 | Ito et al. |
| 2008/0156786 A1 * | 7/2008 | Choi ..................... H05B 3/145 219/212 |
| 2008/0264929 A1 * | 10/2008 | Seo ....................... H05B 3/286 219/548 |
| 2008/0264930 A1 * | 10/2008 | Mennechez ............ H05B 3/26 219/552 |
| 2009/0184107 A1 | 7/2009 | Weiss |
| 2009/0218855 A1 | 9/2009 | Wolas |
| 2009/0242548 A1 | 10/2009 | Iida et al. |
| 2010/0000981 A1 * | 1/2010 | Diemer ................. H05B 3/146 219/202 |
| 2010/0035356 A1 | 2/2010 | Shalyt et al. |
| 2010/0038356 A1 | 2/2010 | Fukuda et al. |
| 2010/0038357 A1 | 2/2010 | Fukuda et al. |
| 2010/0200558 A1 | 8/2010 | Liu et al. |
| 2010/0219664 A1 | 9/2010 | Howick et al. |
| 2010/0282458 A1 | 11/2010 | Ann et al. |
| 2010/0326976 A1 | 12/2010 | Nakajima et al. |
| 2011/0049131 A1 | 3/2011 | Sturgess |
| 2011/0147357 A1 | 6/2011 | Bokelmann et al. |
| 2011/0226751 A1 | 9/2011 | Lazanja et al. |
| 2011/0290775 A1 | 12/2011 | Cubon et al. |
| 2012/0049586 A1 | 3/2012 | Yoshimoto et al. |
| 2012/0228903 A1 | 9/2012 | Abe et al. |
| 2013/0068748 A1 | 3/2013 | Csonti et al. |
| 2013/0106147 A1 | 5/2013 | Lazanja et al. |
| 2013/0186884 A1 | 7/2013 | Barfuss |

FOREIGN PATENT DOCUMENTS

| | | |
|---|---|---|
| EP | 0202896 A2 | 5/1986 |
| EP | 1645166 B1 | 7/2009 |
| EP | 2400814 | 12/2010 |
| EP | 1127356 B1 | 8/2011 |
| GB | 2010650 A | 6/1979 |
| JP | 56093284 A | 7/1981 |
| JP | 57134655 A | 8/1982 |
| JP | 62109385 A | 7/1987 |
| JP | 02-120039 | 5/1990 |
| JP | 11-24493 A | 1/1999 |
| JP | 11-218336 A | 8/1999 |
| JP | 2000333781 A | 12/2000 |
| JP | 2002050459 A | 2/2002 |
| JP | 2004055219 A | 2/2004 |
| WO | 8906480 A1 | 7/1989 |
| WO | 94/09684 A1 | 5/1994 |
| WO | 9701549 A1 | 1/1997 |
| WO | 01/43507 A1 | 6/2001 |
| WO | 02/06914 A1 | 1/2002 |
| WO | 03/101777 | 12/2003 |
| WO | 2005/036930 A1 | 4/2005 |
| WO | 05/047056 | 5/2005 |
| WO | 2005/093158 A1 | 10/2005 |
| WO | 10/065411 A1 | 6/2010 |

OTHER PUBLICATIONS

Potentially related U.S. Appl. No. 13/737,590, filed Jan. 9, 2013, published as 2013/0186884.
Potentially related U.S. Appl. No. 13/621,890, filed Sep. 18, 2012, published as 2013/0068748.
Potentially related U.S. Appl. No. 12/338,971, filed Dec. 18, 2008, published as 2009/0184107.
Potentially related U.S. Appl. No. 12/963,030, filed Dec. 8, 2010, published as 2011/0147357.
Potentially related U.S. Appl. No. 14/275,999, filed May 13, 2014, published as 2014/0339211.
Potentially related U.S. Appl. No. 14/509,744, filed Oct. 8, 2014.
Potentially related U.S. Appl. No. 14/333,975, filed Jul. 17, 2014.
Potentially related U.S. Appl. No. 10/715,160, filed Nov. 17, 2003, U.S. Pat. No. 7,306,283.
Potentially related U.S. Appl. No. 11/923,091, filed Oct. 24, 2007, U.S. Pat. No. 7,741,582.
Potentially related U.S. Appl. No. 12/778,238, filed May 12, 2010, published as 2010/0219664.

(56) References Cited

OTHER PUBLICATIONS

Potentially related U.S. Appl. No. 13/106,148, filed May 12, 2011, published as 2011/0226751.

* cited by examiner

Fig-3A1          Fig-3A2

FELT HEATER AND METHOD OF MAKING

FIELD

The present teachings generally relate to an improved heating device and more specifically a heating device useful as a therapeutic heater, a seat heater, heating flexible devices, the like, or a combination thereof.

BACKGROUND

The present teachings are predicated upon providing an improved heater and more preferably an improved heater for use in a vehicle. Generally, heaters include a wire that is formed in a pattern. The wire produces heat when electricity is applied to the wire. The wire may also be placed in a carbonaceous material so that as the wire heats up the heat is diffused into the carbonaceous material heating a larger area. However, achieving uniform heating in these devices may not always be achieved and hot spots may occur around the heating wires. Further, if a heating wire breaks the heater may cease to heat. Heaters may also include electrodes that are connected by a positive temperature coefficient material so that electricity is conducted from one electrode through the positive coefficient material to the other electrode and heat is produced. Other heaters have a woven configuration where a plurality of long materials are woven together to form a heater. These heaters may result in hot spots along one or more of the long materials as these materials may allow for current drift along one wire. Examples of heaters may be found in U.S. Pat. Nos. 5,824,996; 5,935,474; 6,057,530; 6,150,642; 6,172,344; 6,294,758; 7,053,344; 7,285,748; and 7,838,804; U.S. Patent Application Publication Nos. 2003/155347; 2004/0211772; 2007/0278210; 2009/024548; 2010/0200558; and 2010/0282458; European Patent No. EP2400814; and Japanese Patent Publication No. JP02-120039 all of which are incorporated by reference herein for all purposes.

It would be attractive to have a high degree of flexibility to conform to an occupant and to avoid crinkling noises or the like in response to occupant motion. It would be attractive to minimize part quantities in an assembly and correspondingly to reduce assembly steps. Notwithstanding what exists today, car manufacturers and others continue to seek low cost, light weight, and easy to manufacture ways to provide a heating surface. In this regard one attractive feature is to be free of dependency upon fluctuating prices for high demand metals such as gold, silver, copper, or the like. It would be attractive to avoid dependency of adhesive bonding of conductive metals to a surface.

What is needed is a flexible seat heater that is free of and/or substantially free of gold, silver, and copper. It would be attractive to have a heater that may be subjected to a flexing action without partial or complete failure of all or a portion of the heater. It would be attractive to have a heater that exhibits uniform heating across the heater without having to employ complex power supply configurations and/or expensive controllers. What is further needed is a flexible seat heater that may be cut, bent, shaped, formed, or a combination thereof without losing any heating functions.

SUMMARY

The present teachings meet one or more (if not all) of the present needs by providing an improved heater that includes: (a) a non-woven heating layer having: a plurality of individual fibers that are randomly oriented; a plurality of voids and/or pores interspersed between the plurality of individual fibers that are randomly oriented, and a plurality of edges around a periphery of the heating layer; (b) two or more power applications connecting the heater to a power source; and wherein substantially all of the non-woven heating layer produces heat when power is applied to the non-woven heating layer through the two or more power applications so that the heater has a substantially uniform heating density.

The heater of the teachings may include: a heater comprising: (a) a non-woven heating layer having: a plurality of individual fibers that are randomly oriented; a plurality of voids and/or pores interspersed between the plurality of individual fibers that are randomly oriented: a forward surface, a rearward surface, and a plurality of edges around a periphery of the heating layer; (b) one or more forward cover layers that extends at least partially, entirely, or both over the forward layer; (c) one or more rearward adhesive layers between the one or more forward cover layers and the forward surface of the heating layer that secure at least a portion of the one or more forward cover layers directly to the forward surface of the heating layer; (d) one or more rearward cover layers that extends at least partially, entirely, or both over the one or more rearward layers; (e) one or more rearward adhesive layers between the one or more rearward cover layers and the rearward surface of the heating layer that secure at least a portion of the one or more rearward cover layers directly to the rearward surface of the heating layer; (f) two or more power application layers including: (i) two or more wires disposed on the forward surface or the rearward surface of the heating layer, the two or more wires being spaced apart and extending along an edge region of the two or more edges of the heating layer; (ii) one or more power adhesive layers disposed over each of the two or more wires, the one or more adhesive layers at least partially adhering the two or more wires to the forward surface or the rearward surface; and (iii) two or more nonwoven buss bars disposed over the two or more wires and the one or more power adhesive layers, the two or more nonwoven buss bars each being secured at least partially to the nonwoven heating layer by the one or more power adhesive layers; wherein either the one or more forward cover layers and the one or more forward adhesive layers or the one or more rearward cover layers and the one or more rearward adhesive layers extend at least partially over the two or more power application layers so that the at least a portion of the one or more forward cover layers or the one or more rearward cover layers is adhered to the two or more power application layers; and wherein substantially all of the non-woven heating layer produces heat when power is to the non-woven heating layer.

Another unique aspect of the present teachings envisions a process for creating a heater comprising: (a) obtaining the nonwoven heating layer of the teachings herein; (b) disposing the two or more wires along opposing edge regions of the nonwoven heating layer; (c) connecting the two or more wires to the nonwoven heating layer; (d) disposing the conductive nonwoven strip over each of the two or more wires; (e) attaching the conductive nonwoven strip to the heating layer; wherein the step of connecting and the step of attaching are performed at the same time, or the step of connecting is performed before the step of attaching.

The teachings herein surprisingly solve one or more of these problems by providing a flexible seat heater that is free of and/or substantially free of gold, silver, and copper. The teachings herein provide a heater that may be subjected to a flexing action without partial or complete failure of all or a portion of the heater. The teachings herein provide a heater that exhibits uniform heating across the heater without having to employ complex power supply configurations and/or expensive controllers. The teachings herein provide a flexible seat heater that may be cut, bent, shaped, formed, or a combination thereof without losing any heating functions.

BRIEF DESCRIPTION OF THE DRAWINGS

FIGS. 3A1 and 3A2 illustrate possible buss bar configurations;

DETAILED DESCRIPTION

Figure 1:
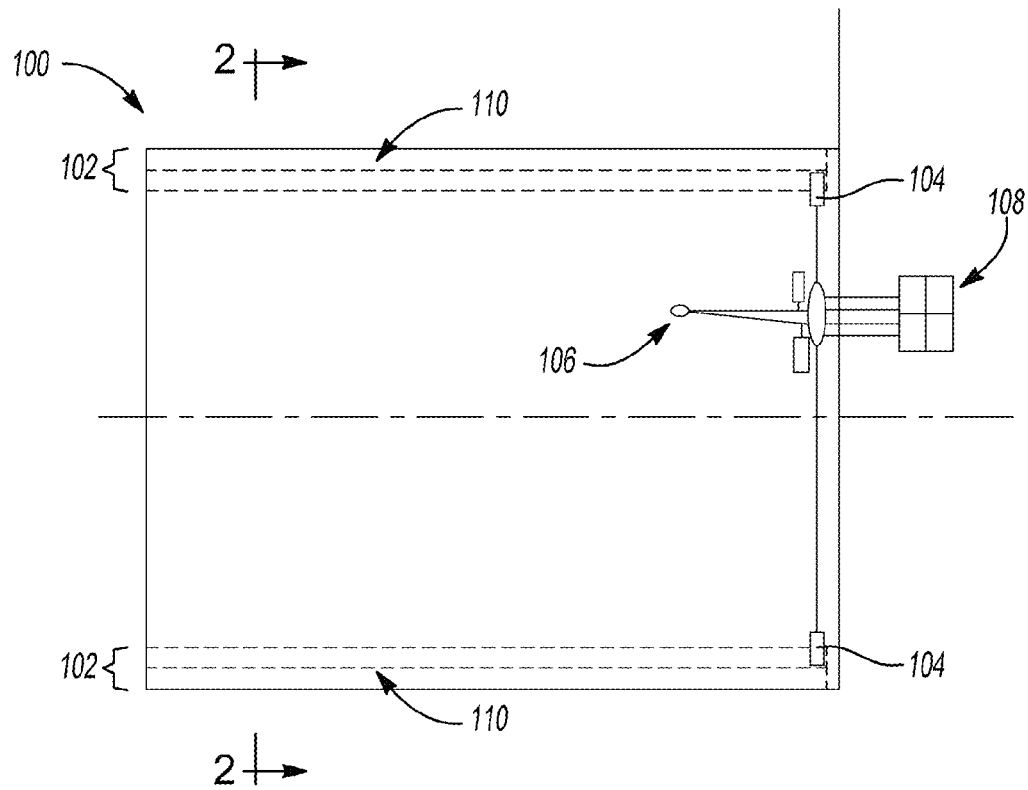
FIG. 1 illustrates one example of a heater of the teachings herein.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The device as taught herein may be useful as a heater and/or incorporated into another device so that the other device may be used as a heater. The device as taught herein may be used for any known heating application. For example, the heater may be used to heat a bed, plants, be a therapeutic heater, vehicle seats, steering wheels, mirrors, glass, flooring, the like, or a combination thereof. Preferably, the device as taught herein may be connected to, incorporated into, or both a vehicle seat and/or the vehicle seat may include the composition taught herein so that a vehicle seat may be heated. The heater as discussed herein may be a discrete piece that is laid over a cushion of a vehicle seat (i.e., bun or back portion) and then a trim cover placed over the heater. A portion of the heater may enter a trench in the cushion so that the heater, the cushion, the trim cover, or a combination thereof are attached to a seat frame. The heater may be shapeable, formable, cuttable, or a combination thereof so that heater may be substantially prevented form heating the trench regions of a vehicle seat. For example, a portion of the heater may be cut out so that substantially only the electrodes, busses, power conductors, or a combination thereof extend into the trench of a vehicle seat. In another example, the heating layer may be cut so that the heating layer extends up to the trench in a central region of the heater but not into the trench and the portion of the heating layer proximate to the electrodes, busses, power conductors, or a combination thereof extends into and/or around the trench to provide support. A trim cover may have attachment features that extend through the heater so that the heater is connected to the trim cover and substantially extends over the trench while the attachment features act to secure both the trim cover and the heater to the seat.

The heater may be secured in the vehicle seat by a mechanical fastener, an adhesive, pressure from one or more adjacent layers, or a combination thereof. The heater may be secured directly to the trim layer, the cushion (i.e., bun, back, or both) of the seat, or a combination of both. A mechanical fastener may extend through, connect to, attach on, or a combination thereof the heater so that the heater may be fixed within the seat. The mechanical faster may be a plastic tag that is punched through the heater and a portion of the seat and/or trim layer so that a fixed connection is formed. The mechanical fastener may be a hog ring, a metal bar that extends over a portion of the heater and pulls the heater, the trim layer into close proximity to the cushion, or both. The heater of the teachings herein may be used in conjunction with other devices.

The heater may be used with a passenger sensor. The heater may be placed over and/or under a passenger sensor. The passenger sensor may be any type of passenger sensor that senses the presence of a passenger. The passenger sensor may be a capacitive sensor, a pressure sensor, a membrane sensor, infrared, passive and/or active ultrasonic sensor, a mass sensor, or a combination thereof. The heater and a passenger sensor may be used with an active cooling system, active heating system, a ventilated system, or a combination thereof.

The heater may be used with an active heating, active cooling, ventilation, or a combination thereof system. The heater may be porous so that air may pass directly through the heater. The heater may include one or more porous layers that cover the heater so that air passes directly through the heater and the one or more layers that cover the heater (e.g., a fleece layer, an adhesive, a protective covering layer, or a combination thereof). The heater may include one or more barrier layers that fully and/or partially cover the heater so that the barrier layers assist in directing fluid flow to regions of the heater that may be contacted. The barrier layer when present may be formed in any configuration so that air may be directed to specific desired locations. For example, the heater may be substantially porous through a central "U" shaped portion of the heater and the regions surrounding the "U" shape may include a non-porous or barrier material that may prevent a fluid from passing so that the fluid moved is directed to the contact areas. The heater may include one or more through holes so that air may be moved through the heater. The heater may include and/or be in fluid communication with a fan and/or blower, be adjacent to a blower and/or fan so that the blower and/or fan may move a fluid through and/or around the heater. The heater, the fan, the blower, or a combination thereof may include a peltier device, a thermoelectric device, or both so that hot and/or cooled air (i.e., conditioned air) may be moved towards an occupant. The heater may be indirectly connected to a fan, blower, or both that include a peltier device, a thermoelectric device, or both.

The heater may be connected to an insert (i.e., bag) that assists in distributing conditioned air to an occupant. The heater may have one or more holes that mirror the holes in the insert. The heater may have no holes and the air from the bag may pass directly through the heater in route to an occupant. The heater layer may be connected directly to the insert. All or a portion of the heater layer may be connected to the insert. The insert may be one or more polymeric layers that form a substantially air impermeable layer and/or an air impermeable layer so that air directed into the insert is directed to a predetermined region. The insert may include one or more spacer materials. The heater as taught herein may act as the spacer material and/or part of a spacer layer that forms an open space in the insert. For example, the spacer layer may be half the height of a standard spacer and the heater may make up the other half of the spacer layer so that air may be distributed throughout the open space formed in the insert. Additional aspects of the insert and its various layers and materials can be gleaned from the teachings herein including those of Column 1, line 45 through Column 3, line 67; Column 4; line 54 though Column 6, line 32 and FIGS. 2-3 of U.S. Pat. No. 7,083,227, and Column 3; line 34 through Column 10; line 2; Column 11, line 4 through Column 13, line 18; and FIGS. 1, 4, 15A and 15B of U.S. Pat. No. 7,735,932 incorporated by reference herein, which shows various alternative embodiments of inserts, insert materials, and insert constructions that may be used with the heater taught herein.

One approach taught herein contemplates use of an electrically conductive heating layer that may include one or more additives, additional layers, or a combination thereof as discussed herein. The heating layer may include one or more flame-retardant ingredients, may be flame resistant, or both. The electrically conductive heating layer may include an organic compound, an inorganic compound, or a combination thereof. The heating layer may include one or more polymeric fibers. For example, a polymeric material of the heating layer is generally thermally stable at temperatures above 40° C. or more, 60° C. or more, or even 100° C. or more. The polymeric material of the heating layer may have a melting point, a softening point, or both that substantially exceeds the temperature of the intended heating application for the heating layer. The polymeric material of the heating layer may include a thermoplastic portion, a cross-linked thermoset portion, or both. The polymeric material of the heating layer may be at least partially oxidized. The polymeric material of the heating layer may have a relatively high Limiting Oxygen Value (LOV), i.e., the weight % amount of oxygen in air in order to make the material burn) (e.g., greater than about 25, 35 or even 45 as measured per ASTM D2863 or ISO 4589). A polymeric material of the heating layer may include a polymer that includes carbon, hydrogen, and optionally nitrogen. The polymeric material of the heating layer may include a polymer that has a repeating unit that includes a carboxylic acid or an ester (or other derivative) of a carboxylic acid, and may optionally contain nitrogen. The polymeric material of the heating layer may include one or more vinyl groups. The polymeric material of the heating layer may include an acrylate, a methacrylate, and/or a nitrile group. For example, a polymeric material of the heating layer may include an acrylonitrile, a methacrylonitrile, or both. A polymeric material for defining the heating layer may have a nominal carbon content of at least about 40%, 50%, or 60% by weight. A polymeric material for defining the heating layer may have a nominal carbon content less than about 90%, 80%, or 70% by weight. A polymeric material for defining the heating layer may have a nominal nitrogen content of at least about 10%, 15% or 20% by weight. A polymeric material for defining the heating layer may have a nominal nitrogen content less than about 35%, 30%, or 25% by weight.

The heater may be formed as a sheet. Preferably, the heater as taught herein is a nonwoven sheet. For example, the heating layer as taught herein may be comprised of a plurality of individual fibers that optionally may be cut to a predetermined length and randomly oriented to form the heater. The heater may conform to virtually any shape. For example, the heater may be wrapped around a circular object so that the circular object is heated. The heater may include a plurality of fibers that form a heating layer. The heating layer may be made up of about 50 percent by weight or more, about 60 percent by weight more, preferably about 70 percent by weight or more, or more preferably about 80 percent by weight or more fibers. The heating layer may be made up of about 82 percent by weight or more, 85 percent by weight or more, about 90 percent by weight or more, about 92 percent by weight or more, or even about 95 percent by weight or more fibers. The heating layer may be made of about 99 percent by weight or less, about 98 percent by weight or less, or about 97 percent by weight or less fibers. The heating layer may include from about 50 percent by weight to 99 percent by weight fibers, preferably from about 70 percent by weight to about 99 percent by weight fibers, and more preferably from about 80 percent by weight to about 99 percent by weight fibers (i.e., from about 80 percent by weight to about 90 percent by weight).

Preferably, the plurality of fibers are randomly distributed throughout the heating layer. More preferably, the plurality of fibers have an average short fiber length so that when combined, the heating layer has a nonwoven structure and the fibers cannot be woven around each other using a mechanical device. Even more preferably, the average fiber length and orientation of the fibers produces a substantially constant heat gradient across, a substantially constant heat density, or both across the heater when power is applied. The fiber may be sufficiently randomly oriented so that the orientation of the fibers forces the power to move and spread throughout the heater proving substantially uniform heating, a uniform heat density, or both and the power is free of traveling along one specific line. In an example, the heating layer taught herein is substantially free of fiber orientation so that the heating layer does not have a machine direction, a cross direction, or both. The heating layer may be free of individual heating wires, heating threads, or both and the heating may occur through the randomly oriented fibers. Randomly oriented as discussed herein means than about 60 of the fibers or less, about 50 or less, preferably about 40 percent or less, more preferably about 30 percent or less, or even more preferably about 20 percent or less of the fibers are oriented in the same direction. The average fiber length may affect the orientation of the fibers.

The average fiber length may be any length so that a nonwoven sheet is formed and the sheet has sufficient strength to be bent, folded, cut, conduct power, be pushed into a trench, stretched, or a combination thereof. The average fiber length may be any length so that the fibers have sufficient contact with each other so that when power is applied, power passes from fiber to fiber and the heater produces a substantially even temperature gradient (i.e., the temperature when measured randomly across the heater is within about ±5° C. or less, about ±3° C. or less, or about ±2° C. or less). The average fiber length may be about 130 mm or less, about 110 mm or less, about 100 mm or less, about 80 mm or less, about 60 mm or less, about 50 mm or less. Preferably, the average fiber length is relatively short. Thus, the average fiber length may be about 40 mm or less, about 30 mm or less, preferably about 28 mm or less, more preferably about 25 mm or less, or even more preferably about 22 mm or less. The average fiber length may vary from about 50 mm to about 1 mm, preferably from about 40 mm to about 3 mm, more preferably from about 25 mm to about 5 mm. The average fiber length as discussed herein may have a standard deviation of ±5 mm or less, ±4 mm or less, preferably ±3 mm or less, more preferably about ±2 mm or less, or even more preferably about ±1 mm or less, or most preferably about ±0.5 mm or less. The maximum fiber length (i.e., the longest fiber in the heater) may be about 200 mm or less, preferably about 175 mm or less, more preferably about 150 mm or less, even more preferably about 100 mm or less, or most preferably about 50 mm or less.

The heating layer may be made of any nonwoven material that conducts electricity and produces heat. The heating layer may be made of any nonwoven material that may be cut, bent, folded, pierced, or a combination thereof any produce heat when power is applied. The heating layer may be made of a material that may be produced using a spunlace process (e.g., hydroentanglement). The heating layer may include carbon, a metallic coated carbon, a polymer, a metallic coated polymer, a binder, or a combination thereof. Preferably, the heating layer includes a plurality of fibers made of carbon or a polymer, and the fibers optionally being coated with one or more layers of a metallic material. One or more coatings may be applied to the fibers before a layer is formed, one or more coatings may be applied to the fibers when the fibers are a layer (e.g., a fiber mat or fiber sheet), a first coating may be applied to the fibers and then a second coating may be applied to the fibers when they are part of the layer, or a combination thereof. In an example, a nylon mat may be formed and then the nylon mat may be coated with copper and then nickel so that the nickel prevents the copper from corroding and/or oxidizing. Polymers that the fiber may be made of are nylon, a polyester, polyurethane, polyamide, an aramid, a para-aramid, a meta-aramid, or a combination thereof. The fibers may be coated with any material that may conduct electricity. Metals that may be used to coat the carbon fibers, the polymer fibers, or both are copper, silver, gold, nickel, aluminum, tungsten, zinc, lithium, platinum, tin, titanium, platina 4, or a combination thereof. In one preferred embodiment the plurality of fibers are made of only of carbon. In another preferred embodiment the fibers are made of nylon or carbon and coated with nickel or silver. If a coated fiber is used the coating may be used as a percentage of the total weight of the heating layer. The percentage of total weight of the coating may be any weight so that when power is supplied to the heating layer the heating layer produces heat. Preferably, the percentage of the coating in the total weight of the heating layer may be a sufficient amount so that the heating layer upon an application of power heats up to a temperature from about 80° C. to about 110° C. The percentage of the coating in the total weight of the heating layer may be a sufficient amount so that the resistivity of the heating layer is from about 2Ω to about 8Ω and preferably from about 3Ω to about 7Ω. The coating may make up about 5 percent or more, about 10 percent or more, or preferably about 15 percent or more of the total weight of the heating layer. The coating may make up about 50 percent or less, about 40 percent or less, or about 30 percent or less of the total weight of the heating layer (i.e., from about 20 percent to about 25 percent of the total weight). An example of one metallized nylon nonwoven fleece is sold with a trade name HNV80 available from YSShield. Some examples of some carbon nonwovens are available under the trade names C10001xxxT Series, NC10004xxxT series, C100040xxT series available from Marktek Inc. The plurality of fibers discussed herein may be held together using a binder.

The binder may be any binder that may form a fixed connection between two or more adjacent fibers. The binder may be any binder that once set may bend; flex; be cut; be punched; resist ripping; resist tearing; be heated without melting, running, significantly softening; assist in conducting power, be free of preventing the transfer of power, or a combination thereof. The binder may be any binder that may bond to fibers made of any of the materials taught herein such as carbon, metallized carbon, a metallized polymer, or a combination thereof. The binder may be water soluble, alcohol soluble, a polyvinyl alcohol (PVA), a polyvinyl nitrate, a polyvinyl acetal, a polyvinyl acetate, a polybinyl butyral, a polyester binder, polyamide, a cross linked polyester binder, or a combination thereof. The binders may be used in a sufficient amount so that the plurality of fibers are held together and a nonwoven material is formed. The binders may be used in the heater in an amount of about 40 percent by weight or less, about 35 percent by weight or less, preferably about 30 percent by weight or less, more preferably about 25 percent by weight or less, or even about 20 percent by weight or less. The binders may be used in an amount of about 1 percent by weight or more, about 5 percent by weight or more, about 10 percent by weight or more, or even about 15 percent by weight or more. The binder may be used in an amount from about 25 percent to about 1 percent, preferably from about 20 percent to about 1 percent, and more preferably from about 20 percent to about 10 percent.

The heating layer is a nonwoven material. Preferably, the heating layer may be felt like (i.e., a nonwoven homogeneous flat structure). More preferably, the heating layer may be a nonwoven materials with a randomly oriented microstructure. The heater may be free of holes. The heater may include holes. The holes may be any shape so that heat is created and the adjoining surface, person, item, device, or a combination thereof is heated. The holes may be round, oval, square, cross-like, long and thin, symmetrical, asymmetrical, geometric, non-geometric, or a combination thereof. The heater may include side cutouts. Preferably, the heater may be free of side cutouts. The heater may be serpentine in shape. Preferably, the heater is not serpentine in shape. The microstructure of the heating layer may include a plurality of pores, a plurality of voids, or both. Voids and pores as discussed herein are part of the microstructure of the heating layer whereas through holes and cutouts are larger and are a space where, for example, material has been removed. The heating layer may have a sufficient amount of voids and/or pores so that air from an air mover can pass through the heating layer, the fibers of the heating layer are randomly oriented, power is randomly distributed throughout the heating layer, a protecting layer can penetrate through the heating layer, or a combination thereof. The voids and/or pores of the heating layer may represent an area of about 10 percent or more, about 15 percent or more, about 20 percent or more, about 25 percent or more, about 30 percent or more, or even about 40 percent or more of a total surface area of the heating layer. The voids and/or pores of the heating layer may represent an area of about 90 percent or less, about 80 percent or less, about 70 percent or less, about 60 percent or less, or about 50 percent or less of the total surface area of the heating layer. The heating layer may have a sufficient amount of fibers and/or material in the heating layer so that one or more other layers may be connected to the heating layer, a protecting layer can form a planar surface over the heating layer, or both.

The heater may include electrodes. The heater may be free of any additional electrically conducting layers (e.g., busses, electrodes, terminals, traces, spurs, branches, or a combination thereof). Preferably, the heater includes busses, electrodes, or both that extend substantially along a length and/or width of the heater and assist in applying power to the heater. More preferably, the heating layer is free of terminals that connect the power source to the heater (i.e., a single point of power application). The heating layer may be free of gold, silver, copper, or a combination thereof. The heater may include positive temperature coefficient material (PTC). The heating layer may be free of any additional electrically conducting layers, positive temperature coefficient layers, additives, or a combination thereof that are added to the heating layer in a separate step, that assist in producing heat, or both. The heating layer may be free of a stabilizing material, a soft filling substance, an impregnated filling material, or a combination thereof. For example, the heating layer is free of a stabilizing material, a soft filing substance, an impregnated filling material, or a combination thereof that is added to the heater to assist in conducting power between the fibers. More preferably, the heating layer may be the only portion of the heater required to produce heat. For example, the heating layer may not be a substrate, the heating layer may be free of one or more materials disposed and/or printed on to form the heating layer, a material interwoven into the material, or a combination thereof. The configuration of the heating layer may be used to vary a resistivity, surface power density, or both of the heating layer.

A heating layer as discussed herein has a resistivity and a surface power density. The resistivity and the surface power density of the heating layer may be varied by varying the size and shape of the heating layer; varying the material construction of the forward cover layer, the rearward cover layer, or both; varying the amount of voltage applied to the heating layer; varying the amount of amperage applied to the heating layer; or a combination thereof. For example, the resistivity and surface power density of the heating layer may be varied by removing material from the heating layer (e.g., adding cutouts, through holes, slits, or a combination thereof. In another example, material may strategically be removed from the heating layer so that the resistivity of the heater is increased. The resistivity of the heating layer may be about 1Ω or more, preferably about 2.5Ω or more, more preferably about 4Ω or more, or more preferably about 5Ω or more. The resistivity of the heating lay may be about 20Ω or less, about 15Ω or less, about 10Ω or less, or about 8Ω or less (i.e., from about 5.2Ω to about 7.2Ω). The resistivity may be directly proportional to the surface power density of the heating layer. Preferably, the resistivity is inversely proportional to the surface power density of the heating layer. Thus, as the resistivity is increased the surface power density is decreased.

The surface power density of the heating layer may be about 100 W/m² or more, about 200 W/m² or more, about 300 W/m² or more, or about 400 W/m² or more. The surface power density may be about 2000 W/m² or less, about 1500 W/m² or less, about 1000 W/m² or less, or about 750 W/m² or less (i.e., from about 600 W/m² to about 450 W/m²). One or more other factors discussed herein may impact the resistivity, the surface power density, or both such as basis weight, areal weight, or both of the heating layer.

The heating layer may be characterized by an areal weight (i.e., weight per unit areas of a fabric). The areal weight may be about 1 g/m² or more, about 2 g/m² or more, about 3 g/m² or more, preferably about 4 g/m² or more, more preferably about 6 g/m² or more, or most preferably about 8 g/m² or more. The areal weight may be about 500 g/m² or less, about 200 g/m² or less, preferably about 100 g/m² or less, or more preferably about 85 g/m² or less. The areal weight may be between about 5 g/m² and about 200 g/m², preferably between about 8 g/m² and about 100 g/m², and more preferably between about 10 g/m² and about 20 g/m² (i.e., 12 g/m², 14 g/m², or 17 g/m²).

The material of the heating layer possess a basis weight. The basis weight of the heating layer may be about 2 g/m² or more, about 4 g/m² or more, preferably about 6 g/m² or more, or more preferably about 8 g/m² or more. The basis weight of the heating layer may be about 500 g/m² or less, about 200 g/m² or less, about 150 g/m² or less, preferably about 100 g/m² or less, or more preferably about 85 g/m² or less. The weight of the heating layer may be between about 5 g/m² to about 200 g/m², preferably between about 10 g/m² and about 150 g/m², more preferably between about 10 g/m² and about 100 g/m², and most preferably between about 10 g/m² and about 20 g/m² (i.e., 12 g/m², 14 g/m², or 17 g/m²). One property that the fibers of the heating layer possess is a density. The density of the fibers may be about 0.5 g/cm³ or more, about 0.75 g/cm³ or more, about 1.0 g/cm³ or more, or about 1.2 g/cm³ or more. The density of the fibers may be about 10 g/cm³ or less, about 5.0 g/cm³ or less, about 3.0 g/cm³ or less, or about 2.0 g/cm³ or less. The density of the fibers may be between about 0.5 g/cm³ to about 3.0 g/cm³, preferably between about 1.0 g/cm³ and about 2.0 g/cm³, and more preferably between about 1.1 g/cm³ and about 1.5 g/cm³.

The fibers of the heating layer may be characterized by a diameter. The diameter of the fibers may be about 0.0001 mm or more, preferably about 0.001 mm or more, preferably about 0.005 mm or more, or most preferably about 0.0065 or more. The diameter of the fibers may be about 1 mm or less, about 0.5 mm or less, about 0.1 mm or less, preferably about 0.05 mm or less more preferably about 0.02 mm or less, or most preferably about 0.008 or less (i.e., between about 0.007 and about 0.006 mm). The diameter of the fibers may be between about 0.0005 mm and about 0.1 mm, preferably between about 0.001 mm and about 0.05 mm, and more preferably between about 0.005 mm and about 0.02 mm.

The material of the heating layer possess a thickness. The thickness of the heating layer may be any thickness so that upon application of power the heating layer produces heat. The heating layer may be sufficiently thin so that the resistivity is from about 2Ω to about 8Ω and preferably from about 3Ω to about 7Ω and heating performance of the heating layer is improved when compared to heating layer lower than the heating layer taught herein. The thickness of the heating layer may be about 0.001 mm or more, about 0.005 mm or more, or preferably about 0.07 mm or more. The thickness of the heating layer may be about 30 mm or less, about 10 mm or less, preferably about 5 mm or less, more preferably about 2 mm or less, or more preferably about 1.0 mm or less. The thickness of the heating layer may be between about 0.001 mm and about 10 mm, preferably between about 0.005 mm and about 5 mm, and more preferably between about 0.07 mm and about 1 mm.

The material of the heating layer may be characterized by a thermal conductivity. The thermal conductivity at 23° C. may be about 2.0 W/m*k or less, about 1.0 W/m*k or less, about 0.5 W/m*k or less, or about 0.005 W/m*k or less. The thermal conductivity at 23° C. may be about 0.001 W/m*k or more, about 0.005 W/m*k or more, or about 0.01 W/m*k or more. The thermal conductivity may be between about 1.0 W/m*k to about 0.001 W/m*k, preferably between about 0.5 W/m*k to about 0.005 W/m*k, and more preferably between about 0.01 W/m*k and about 0.075 W/m*k measured at 23° C. using ASTM STP 1426 or ASTM STP 1320. The thermal conductivity at 600° C. may be about 3.0 W/m*k or less, about 2.0 W/m*k or less, about 1.0 W/m*k or less, about 0.5 W/m*k or less, or about 0.01 W/m*k or less. The thermal conductivity at 600° C. may be about 0.001 W/m*k or more, about 0.005 W/m*k or more, about 0.01 W/m*k or more, or about 0.05 W/m*k or more. The thermal conductivity may between about 1.5 W/m*k to about 0.001 W/m*k, preferably between about 0.7 W/m*k to about 0.007 W/m*k, and more preferably between about 0.1 W/m*k to about 0.01 W/m*k measured at 600° C. using ASTM STP 1426 or ASTM STP 1320.

The heating layer includes a specific heat. The specific heat at 23° C. may be about 0.001 W*sec/g*K or more, about 0.01 W*sec/g*K or more, preferably about 0.1 W*sec/g*K, or more preferably about 0.5 W*sec/g*K or more. The specific heat at 23° C. may be about 5.0 W*sec/g*K or less, about 2.0 W*sec/g*K or less, or about 1.0 W*sec/g*K or less. The specific heat may be between about 2.0 W*sec/g*K and about 0.001 W*sec/g*K, preferably between about 1.5 W*sec/g*K and about 0.01 W*sec/g*K, and more preferably between about 1.0 W*sec/g*K and about 0.1 W*sec/g*K measured at 23° C. using ASTM STP 1426 or ASTM STP 1320. The specific heat at 600° C. may be about 10 W*sec/g*K or less, about 5.0 W*sec/g*K or less, or about 3.0 W*sec/g*K or less. The specific heat at 600° C. may be about 0.1 W*sec/g*K or more, about 0.5 W*sec/g*K or more, about 1.0 W*sec/g*K or more, or about 1.5 W*sec/g*K or more. The heating layer may have a specific heat of between about 10.0 W*sec/g*K and about 0.01 W*sec/g*K, preferably between about 5 W*sec/g*K and about 0.1 W*sec/g*K, and more preferably between about 2.5 W*sec/g*K and about 0.75 W*sec/g*K measured at 600° C. using ASTM STP 1426 or ASTM STP 1320.

The heating layer includes a breaking tensile strength. The breaking tensile strength may be about 1 N/cm or more, about 1.5 N/cm or more, or preferably about 2 N/cm. The breaking tensile strength may be about 100 N/cm or less, about 80 N/cm or less, or about 60 N/cm or less. The heating breaking tensile strength of the heating layer may be from about 0.5 N/cm to 100 N/cm, preferably from about 1.0 N/cm to 80 N/cm, and more preferably from about 1.5 N/cm and 60 N/cm.

The heater layer includes carbon. The heater layer may be comprised primarily of carbon. The heater layer may include about 50 percent by weight carbon or more, about 60 percent by weight carbon or more, about 75 percent by weight carbon or more, about 80 percent by weight carbon or more, preferably about 85 percent by weight carbon, more preferably about 90 percent by weight carbon or more, even more preferably about 95 percent by weight carbon or more, or most preferably about 97 percent by weight carbon or more. The heater layer may comprise 99 percent by weight carbon. The heater layer may comprise substantially about 100 percent by weight carbon.

The heater layer may be a compound that includes carbon. The heater layer may be any carbon containing compound that: heats up when electricity is added to the heating layer; exhibits PTC characteristics; is resistant to burning, flame, or both; is durable and can resist being bent, flexed, folded, or a combination thereof a plurality of times, is resistant to read through; or a combination thereof. The heating layer may have a chemical composition of $(C_3H_3NO_{0.5})_N$. The heating layer may include one or more of the following elements: carbon, nitrogen, oxygen, hydrogen, sodium trace metals, or a combination thereof. The heating layer may include nitrogen, oxygen, hydrogen, or a combination thereof in any suitable amount so that the heating layer heats when electricity is applied, the heating layer increases in temperature, the heating layer exhibits any other characteristics discussed herein, or a combination thereof. The heating layer composition may include nitrogen in an amount of about 10 percent by weight or more, about 15 percent by weight or more, or about 20 percent by weight or more. The heating layer composition may include nitrogen in an amount of about 35 percent by weight or less, about 30 percent by weight or less, or about 25 percent weight or less while still maintaining some nitrogen in the composition. The heating layer composition may include oxygen in an amount of about 5 percent by weight or more, about 8 percent by weight or more, or about 10 percent by weight or more. The heating layer composition may include oxygen in an amount of about 30 percent by weigh or less, about 20 percent by weight or less, or about 15 percent by weight or less while maintaining some oxygen in the composition. The heating layer composition may include trace elements. The trace elements may be any element that is present in the composition in an amount less than 1 percent by weight, preferably about 0.5 percent by weight or less, and more preferably about 0.1 percent by weight or less. The trace elements may be sodium, trace metals, impurities, bonded or unbounded water, or a combination thereof. The heater may be substantially free of hydrogen, oxygen, hydrogen, nitrogen, trace elements, or a combination thereof.

The material of the heating layer may include have resistance to chemicals. Generally, the material of the heating layer may exhibit one or more of the following resistances to chemicals and/or material characteristics. The material of the heating layer may have good resistance to strong acids. The material of the heating layer may have excellent resistance to weak acids. The material of the heating layer may have poor resistance to strong bases. The material of the heating layer may have good resistance to weak bases. The material of the heating layer may have excellent chemical resistance to organic solvents. The material of the heating layer may exhibit a low modulus of elasticity (i.e., the material does not stretch), non-abrasive, non-hardening, self-lubricating, or a combination thereof.

The heating layer may be formed by mixing together one or more of the compositions discussed herein. The mixed composition may be extruded forming fibers, a sheet, a mat, a thread, or a combination thereof. The composition may be poured into a mold forming the heating layer. The heating may be formed by mixing together a plurality of fibers and forming a mat. The materials may form a first substance that may exhibit heating characteristics discussed herein. The materials may be subjected to a secondary treatment.

The secondary treatment may partially and/or fully remove and/or eliminate one or more of the components of the material. The secondary treatment may substantially increase the amount of carbon in the material on a percent by weight basis. The secondary treatment may make the material more electrically conductive. The secondary treatment may create a heating element pattern that may heat when energy is applied. For example, the secondary treatment may form a heating element pattern that may heat and the area surrounding the heating element pattern that was not subjected to the secondary treatment may be free of heating characteristics. The secondary treatment may include heating. The materials may be placed in a furnace so that the materials are heat modified. The furnace may be of any temperature so that the materials are heat modified and exhibit the characteristics discussed herein. The furnace may have a temperature of about 500° C. or more, about 1000° C. or more, about 1500° C. or more, about 2000° C. or more, about 2500° C. or more, or about 3000° C. or more. The furnace may have a temperature of about 5000° C. or less, about 4000° C. or less, or about 3500° C. or less. The furnace may have an air atmosphere, an inert atmosphere, vacuum, or a combination thereof. The material may be in the furnace for any duration so that the material exhibits one or more of the characteristics discussed herein. The material may be in the furnace for a duration of about 30 min or more, about 45 min or more, or even about 1 hour or more. The material may be in the furnace for a duration of about 3 hours or less, about 2.5 hours or less, about 2.0 hours or less, or about 1.5 hours or less. Preferably, the furnace may include a nitrogen atmosphere. It is contemplated that only a portion of the material may be subjected to a select secondary treatment. For example, the material once formed may be placed in a nitrogen atmosphere and a controlled heating device may subject portions of the material to heat so that the specified portions exhibit one or more of the characteristics discussed herein. The portions of the material subjected to a controlled heating device may exhibit superior electrical conductivity when compared to the material that was not subjected to the secondary treatment. The depth, width, pattern, shape, final chemical composition, or a combination thereof of the material subjected to the select secondary treatment may be controlled using the select secondary treatment. The select secondary treatment may control one or more of the depth, width, pattern, shape, final chemical composition, or a combination thereof of the material subjected to the select secondary treatment by adjusting the duration at each location, the intensity of the heat, the type of heater used, the type of atmosphere, or a combination thereof. The heater may be a laser, an electrical arc (e.g., a plasma arc, arc welder, the like, or a combination thereof), a flame, electron beam, any other device that creates a suitable amount of heat that may be focused so that a the secondary treatment may be performed in a select manner, or a combination thereof. Thus, it is contemplated that the region subjected to a secondary treatment may heat and the area free of secondary treatment may be free of heat. A select secondary treatment process may eliminate material waste (i.e., the secondary treatment may form the desired heater shape as opposed to cutting the material in the desired shape). The heater when attached to an electrical source may produce heat.

The heating layer may be attached to at least two terminals and upon application of electricity (e.g., power) the heating layer produces heat. The heating layer when connected to a positive power source and a negative power source (i.e., power application layers) may produce heat. Preferably, the heating layer is free of terminals that connect to busses and/or electrodes to the heating layer. For example, the busses and/or electrodes may be connected to the heating layer and the busses and/or electrodes may be connected to the power source. The terminal may directly and/or indirectly attach to the heating layer using any device so that electricity enters the heating layer through the terminals and the heating layer produces heat. The terminals may be crimped onto the heating layer. For example, the power applications may include terminals that connect a power source to the power applications. The terminals may be connected by sewing, bonding, a mechanical fastener, or a combination thereof to the heating layer, each power application layer, or both. Preferably, the heating layer may free of terminals directly attached to the heating layer (i.e., a single point of power application). The heater may be free of mechanical fasters that attach a power source to the heater. For example, the heating layer may not have a mechanical attachment device that grips the heating layer and secures one or more wires to the heater. The heating layer may include two or more power applications that assist in supplying power to the heating layer.

The two or more power applications may be located at any location on the heater. Preferably, the two or more power applications are spaced apart. The two or more power applications may be spaced a sufficient distance apart so that the heater is partially and/or entirely energized upon an application of power. More preferably, the two or more power applications are located in an edge region of the heater. For example, one power application may be located along one edge of the heater and a second power application may be located along the opposing edge so that power travels though the heater as the power travels from the first edge to the second edge. Each power application may include one or more parts for applying power. In one preferred example, each of the power applications consist of two discrete buss bars, electrodes, wires, or a combination thereof that are connected together and each of the two buss bars, electrodes, wires, or a combination thereof assist in supplying power to the heating layer. The buss bars, electrodes, wires, or a combination thereof may be made of the same material, different material, or a combination thereof.

Each of the buss bars and/or electrodes in a single power application, preferably, are made of two or more different materials. The power application may include one or more wires and preferably two or more wires that are interwoven together. The wires may be made of any conductive material that assists in transferring power to the heating layer so that heat is produced. Each wire may have a resistivity of about 5 $\Omega$*m or less, about 2 $\Omega$*m or less, or about 1 $\Omega$*m or less. Each wire may have a resistivity of about 0.01 $\Omega$*m or more, about 0.05 $\Omega$*m or more, or about 0.01 $\Omega$*m or more (i.e., about 0.25 $\Omega$*m). Each wire may have a weight of about 0.1 g/mm or less, about 0.01 g/mm or less, about 0.001 g/mm or less or about 0.0001 g/mm or less. Each wire may have a weight of about 0.00001 g/mm or more, preferably about 0.00005 g/mm or more, more preferably about 0.0001 g/mm or more, or most preferably about 0.0005 g/mm or more (i.e., about 0.0007 g/mm). Each of the wires in a preferred embodiment is a composite of a plurality of wires braided together to form a single wire. Each wire may have a weight of about For example, the wire may be 20 silver wires each having a diameter of about 0.07 mm, and each of the 20 silver wires may be braided together to form a single wire. The wires are preferably made of copper, silver, gold, nickel, or a combination thereof and/or coated with copper, silver, gold, nickel, or a combination thereof so that power is transferred to the heating layer. The one or more wires may be connected to the heating layer by any device that fixedly connects the one or more wires to the heater and does not substantially interfere with the transfer of power to the heating layer. Some examples of attachment devices and/or methods that may be used are sewing, gluing (e.g., with conductive or non-conductive glue), bonding, interweaving, stapling, or a combination thereof. Preferably, an adhesive layer is used to connect the one or more wires to the heating layer. The adhesive layer that secures the one or more wires to the heating layer may also connect a second buss bar and/or electrode to the heating layer.

The power application may be made of any material that upon application of power assists in transferring the power to the heating layer so that the heating layer becomes hot. The power application may include a buss bar and/or electrode that is located under the one or more wires, preferably over the one or more wires, or a combination of both. The power application may be free of a wire and may only be made of a nonwoven material as discussed herein. For example, a clip may be attached directly to the nonwoven material that provides an electrical connection to supply power to the heating layer. The buss bar and/or electrode may be a nonwoven material that has electrically conductive properties. The buss bar and/or electrode may be one or more conductive non-woven strips. The buss bar and/or electrode may be made of the same material as the heating layer. Preferably, the buss bars and/or electrode may be made of a carbon material, a polymeric material, a metallic coated material, or a combination of materials that form a conductive medium for carrying power to the heater. For example, the buss bars and/or electrodes may be a plurality of nylon fibers that are coated with nickel or silver and the coated nylon fibers may be are bonded together in a binder and form a nonwoven material that conducts power to the heating layer. The buss bars and/or electrodes may be attached to the heating layer using any material and/or method as discussed herein for the one or more wires. Preferably, the buss bars and/or electrode, one or more heating wires, or a combination of both are connected to the heating layer using an adhesive fabric. More preferably, each power application includes two or more wires and a non-woven conductive material that are connected to the heating layer by an adhesive layer.

The adhesive layer may be any adhesive sheet that forms a connection upon an application of heat. The adhesive layer may be any adhesive layer discussed herein. The adhesive layer may a polyamide. The adhesive layer preferably is a non-woven material. The adhesive layer preferably is a plurality of fibers and/or fiber-like adhesive particles interconnected with voids and/or pores between the interconnected fibers and/or fiber-like adhesive particles. The adhesive layer may have a plurality of voids, a plurality of pores, or both. The adhesive layer may have a sufficient amount of voids and/or pores so that when the adhesive is connecting two or more electrically conducting layers (e.g., one or more layers of the power application, the heating layer, or both) power may pass through the voids and/or pores, an electrical connection may be maintained, the adhesive layer does not interfere with the supply of power between two or more electrically conducting layers, or a combination thereof, and a connection may be formed between the two or more layers. The voids and/or pores of the adhesive layer may represent an area of about 10 percent or more, about 20 percent or more, about 30 percent or more, preferably about 40 percent or more, or more preferably about 45 percent or more of a total surface area of the heating layer. The voids and/or pores of the adhesive layer may represent an area of about 90 percent or less, about 80 percent or less, about 70 percent or less, or about 60 percent or less of the total surface area of the heating layer. The adhesive may have a basis weight of about 5 g/m² or more, about 10 g/m² or more, or about 15 g/m² or more. The adhesive may have a basis weight of about 50 g/m² or less, about 30 g/m² or less, or about 25 g/m² or less (i.e., about 19 g/m²). The adhesive may have an initial melting temperature of about 85° C. or more, about 100° C. or more, or about 110° C. or more. The adhesive may have an initial melting temperature of about 200° C. or less, about 180° C. or less, or about 160° C. or less (i.e., about 150° C.). An example of an adhesive fabric that may be used is sold under the trade name Spunfab available from Spunfab Ltd.

The power application (i.e., the buss bar and/or electrode, the one or more wires, or a combination of both) may be made of any material that has a surface conductivity of about $1.0 \times 10^{-2}$ Ω/sq or less, about $5.0 \times 10^{-2}$ Ω/sq or less, preferably about $1.0 \times 10^{-3}$ Ω/sq or less, more preferably about $5.0 \times 10^{-3}$ Ω/sq or less, or most preferably about $1.0 \times 10^{-4}$ Ω/sq or less. The power application (i.e., the buss bar and/or electrode, the one or more wires, or a combination of both) may be made of a material with a surface conductivity of about $1.0 \times 10^{-9}$ Ω/sq or more, about $5.0 \times 10^{-8}$ Ω/sq or more, or about $1.6 \times 10^{-8}$ Ω/sq or more.

The heater may be comprised of only a heating layer (e.g., the heater may include one layer). Preferably, the heater includes at least three layers. However, the heater may be free of any layers that are secured over the heating layer. For example, the heater may include a layer that interpenetrates the heating layer and forms a partially and or fully protecting layer over the heating layer. Preferably, the heater includes an forward cover layer, an rearward cover layer, or both. The forward cover layer, the rearward cover layer, or both may be made of the same material, a different material, or both. The forward cover layer, the rearward cover layer, or both may be made of any material that protects that heater and exhibits one or more of the characteristics listed herein. The forward cover layer, the rearward cover layer, or both may be made of a polymeric material, a woven material, a nonwoven material, or a combination thereof. The forward cover layer, the rearward cover layer, or both may substantially encapsulate the heater layer, form a hermetic seal around the heating layer, or both. The heating layer may be sandwiched between the forward cover layer and the rearward cover layer, but a hermetic seal may not be formed. The forward cover layer, the rearward cover layer, or both may be flexed, bent, folded, crimped, or a combination thereof repeatedly without plastically deforming, elastically deforming, failing, breaking, tearing, creasing, or a combination thereof; heat resistant; flame resistant; chemical resistant; or a combination thereof. The forward cover layer, the rearward cover r layer, or both may be a film. The forward cover layer, the rearward cover layer, or both may be made of or include a polymeric material that glued and/or surface melted (i.e., heat laminated to the heating layer). The polymeric material may be a polyester, polyurethane, polyethylene terephthalate; polyvinyl fluoride, polyethylene, polyetherimide, acrylic adhesive, acrylic, urethane, silicone, rubber (e.g., natural, synthetic, acrylic, butadiene, butyl, chlorobutyl, chlorinated polyethylene, chlorosulphonated polyethylene, ethylene propylene rubber, or a mixture thereof); or a combination thereof. The material of the forward cover layer, the rearward cover layer, or both may have glass transition that is sufficiently high so that the forward cover layer, the rearward cover layer, or both are free of softening in the temperature range of the heating layer. The forward cover layer, the rearward cover layer, or both may have a glass transition temperature of about 105° C. or more, preferably about 115° C. or more, and more preferably about 120° C. or more.

The heating layer may incorporate partially and/or entirely a discrete material (i.e., a protecting layer) into the heating layer so that the heating layer is protected by the protecting layer. The protecting layer may be a reinforcing layer. For example, the protecting layer may reinforce the individual fibers so that the fibers are strengthened and the strength characteristics of the heater is increases (e.g., tensile strength, tearing strength, fold strength, the like, or a combination thereof). The protecting layer may be any material that becomes interwoven into the heating layer so that the protecting layer increases the strength of the heating layer (e.g., tensile strength, tearing strength, fold strength, the like, or a combination thereof), the insulation properties of the heating layer, or both. Preferably, the protecting layer increases the strength of the heating layer and forms a partially dielectric coating over the heater or a fully dielectric coating over the heater. The protecting layer may form an insulating layer over the forward surface, the rearward surface, the side edges, or a combination thereof of the heating layer so that the heating layer on the outside has dielectric characteristics. The protecting layer may be made of any material as discussed herein for the forward cover layer, the rearward cover layer, or both. The protecting layer may form a layer on a forward side, a rearward side, a side edge, a top edge, a bottom edge, or a combination thereof so that the protecting layer is a dielectric layer over the heating layer. The protecting layer may fill the pores and/or voids between the individual fibers of the heating layer. Preferably, the protecting layer fills the pores and/or voids between the individual fibers of the heating layer, but does not entirely surround the individual fibers so that the connections and/or electrical connections between the fibers remain intact. The protecting layer may be made of a liquid material that coats and/or penetrates into the heating layer. Preferably, the protecting layer penetrates into the heating layer, the heater, or both and coats the portions of the heater, the heating layer, or both that are contacted by the protecting layer. The protecting layer may be applied by dipping, spraying, brushing, rolling, the like, or a combination thereof. The protecting layer may be applied to a heating layer before the power applications are connected to the heating layer, after the power applications are applied, or a time therebetween. For example, if a completely dielectric heating is desired then the power applications are applied to the heating layer and then the protecting layer is applied over both the heating layer and the power application layers. In another example, if a non-dielectric heater that is high in strength is desired then the protecting layer may be applied to the heating layer and then the power applications applied to the heating layer. Preferred materials that may be used for the protecting layer are urethane and acrylic, although as previously discussed the materials for the forward cover layer and the rearward cover layer may be used. The material properties of the protecting layer may affect the final characteristics of the heater (e.g., conductivity of the heater, strength, the like, or a combination thereof).

The material properties of the protecting layer when being applied to the heating layer, the heater, or both may affect the characteristics of the heater. One characteristic of the protecting layer that may affect the characteristics of the heater is viscosity of the protecting layer during application. For example, if the viscosity is water like then the heater may be more conductive versus if the viscosity is oil-like. The viscosity of the protecting layer may be any viscosity so that the material of the protecting layer penetrates into the heating layer, the heater, or both. The viscosity of the protecting layer when the protecting layer is water-like may be about 0.0035 Pa*s or less, about 0.0030 Pa*s or less, about 0.0025 Pa*s or less, about 0.0020 Pa*s or less, preferably about 0.0015 Pa*s or less, or more preferably about 0.0010 Pa*s or less when measured at about 20° C. The viscosity of the protecting layer when in water-like liquid form may be between about 0.0005 Pa*s and about 0.0025 Pa*s and preferably between about 0.0010 Pa*s and about 0.00175 Pa*s when measure at about 20° C. The viscosity of the protecting layer when the protecting layer is oil-like may be about 0.0035 Pa*s or more, preferably about 0.0040 Pa*s or more, more preferably about 0.0045 Pa*s or more, or even about 0.0050 Pa*s or more when measure at about 20° C. The viscosity of the protecting layer when in an oil-like liquid form may be between about 0.0035 Pa*s and about 0.0060 Pa*s and preferably between about 0.0040 Pa*s and 0.0050 Pa*s when measured at about 20° C. The viscosity of the protecting layer may affect the final thickness of the protecting layer on the heating layer, the heater, or both. Thus, for example, the water like viscosity may form a coat with a total thickness (i.e., extending from the heating layer on both sides (e.g., total thickness of the heating layer with the coating minus the thickness of the heater)) of about 0.0001 mm and the oil like viscosity may form a coat with a total thickness of about 0.005 mm. The total thickness of the water like viscosity coating is about 0.0001 or less, about 0.00005 or less, about 0.00001 or less, or preferably substantially equal to 0. The total thickness of the oil like viscosity coating may be about 0.0001 mm or more, about 0.0005 mm or more, or preferably about 0.007 mm or more. The total thickness of the oil like viscosity coating may be about 15 mm or less, about 8 mm or less, preferably about 3 mm or less, more preferably about 1 mm or less, or more preferably about 0.5 mm or less.

The heater may include one or more attachment layers. The attachment layer may be a single sided adhesive layer. The attachment layer may be made of the same material as the adhesive discussed herein for attaching the power applications. The attachment layer may be an adhesive layer (e.g. a glue, paste, spray on adhesive, an adhesive film, a peel and stick, hook and loop, or the like). Preferably, the attachment layer may be a peel and stick film. The attachment layer may exhibit protection characteristics as discussed herein. The heater may be free of an attachment layer.

The heater (e.g., heating layer, forward cover layer, rearward cover layer, adhesive layers, attachment layers, or a combination thereof) as discussed herein may have a high fold resistance. The heater may have sufficient fold resistance so that the heater when placed in a seat may withstand wear for about 5 years or more, preferably about 7 years or more, or more preferably use for 10 years or more. The heater may have sufficient fold resistance that the heater may withstand 50,000 cycles or more, preferably 100,000 cycles or more, or more preferably about 200,000 cycles or more in the Z-direction without the heater losing any function.

The heater as discussed herein may be produced using a process. The process may include one or more of the following steps produced in virtually any order. A plurality of the fibers discussed herein may be obtained. The fibers as discussed herein may be coated with metal, chopped to a desired length, refined so that the fibers are flatted, refined so that the fibers have an oval shape, or a combination thereof. The fibers may be mixed with, covered, with, moved into contact with, or a combination thereof any binder as discussed herein. The fibers may be arranged within a container so that the fibers have a random orientation. The fibers may be extruded with or without the binder forming a nonwoven sheet. The fibers may be assembled using hydroentanglement. The fibers may be sprayed with a binder, dipped in a binder, coated with a binder, or a combination thereof. Attaching one or more power applications to the heating layer. Attaching one or more wires, one or more non-woven conductive strips, one or more electrodes and/or buss bars, attaching one or more pre-assembled power applications, or a combination thereof. Heating the heating layer and the one or more wires, one or more non-woven conductive strips, one or more electrodes and/or buss bars, attaching one or more pre-assembled power applications, or a combination thereof so that an electrical connection is formed to the heating layer. Producing a pre-assembled power application by combining one or more wires, one or more non-woven conductive strips, one or more adhesive layers, one or more buss bars and/or electrodes, or a combination thereof together so that when placed on the heater and heated the adhesive connects the pre-assembled power application to the heating layer and an electrical connection is formed. Connecting the one or more power applications to a power source, a wire, or both. Applying a shrink tube to the one or more power applications, power sources, wires, or a combination thereof so that during a step of heating the shrink tube shrinks and the one or more power applications and power sources, wires, or both are electrically and physical connected. Applying a forward cover layer, a rearward cover layer, a connection layer (e.g., adhesive layer, mechanical attachment layer, or both), or a combination thereof to the heating layer. Cutting the heating layer so that the heating layer includes through holes, cutouts, or both. Applying a fire retardant material, a flame resistant material, a water resistant material, a dielectric layer, or a combination thereof to the heating layer. Attaching a temperature sensor to the heating layer, the heater, or both. Electrically connecting the temperature sensor to a power source. Connecting (e.g., physically and/or electrically) the heating layer to a controller, a control module, or both. Connecting the heater to a vehicle seat, a floor, a steering wheel, a mirror, an insert, or a combination thereof.

As discussed herein the heater may be integrated into another component during the construction of the component so that the heater and the component form one unitary piece. For example, if the article is a molded part the heating medium, which forms the heating layer, may be added into the mold so that when a final article is created the heater layer is throughout the article and the entire article heats when electricity is added. The heating medium may be individual fibers. The heating medium may be a sheet. The heating medium may be sprinkled into the mold, cut and placed in the mold as a sheet, mixed into the molding material and both materials added to a mold together, or a combination thereof.

The heater a discussed herein may be controlled using any method discussed herein. Preferably, the heater include a thermistor or a negative coefficient temperature sensor that measures the temperature of the heater and based upon the measured temperature a controller controls the temperature of the heater, the ventilation system, the conditioning system, or both. The heater, the conditioning system, the ventilation system, or both may be controlled using pulse width modulation.

FIG. 1 illustrates a top view of one possible heater 100 of the teachings herein. The heater 100 as illustrated includes side edge regions 102 and a power application 110 in each side edge region 102. Each of the power application 110 is connected to a power source 104 on an end of the heater 100. The heater 100 is connected to a temperature sensor 106 and a controller 108 so that the temperature of the heater 100 is controlled.

Figure 2:
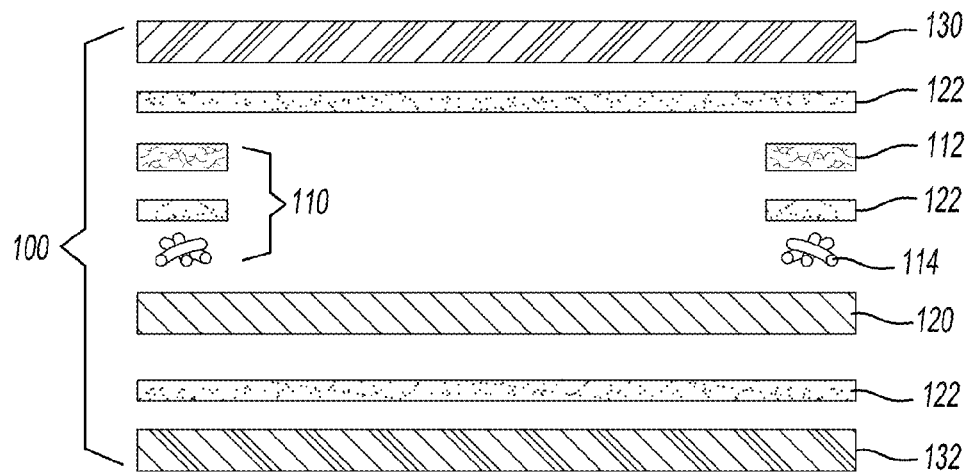
FIG. 2 illustrates a cross-sectional view of the heater of FIG. 1.

FIG. 2 illustrates an exploded cross-sectional view of FIG. 1 of the teachings herein. The heater 100 has a heating layer 120, and the heating layer 120 is sandwiched between a forward cover layer 130 and a rearward cover layer 132. The forward cover layer 130 and the rearward cover layer 132 are at least partially connected to the heating layer by an adhesive layer 122. A power application 110 is located between the heating layer 120 and the forward cover 130, and an adhesive layer 122 covers the power application 110 so that a portion of the forward cover layer 130 is connected to each power application 110. Each power application 110 as shown includes a nonwoven power application buss and/or electrode 112 that is located above an adhesive layer 122 and a plurality of power application wires 114. The adhesive layer 122 is located between the nonwoven power application buss and/or electrode 112 and the plurality of power application wires 114 and connected both the non-woven power application buss and/or electrode 112 and the plurality of power application wires 114 to the heating layer 120 so that power is transferred to the heating layer 120.

FIGS. 3A1 and 3A2 illustrate examples of power applications 110 as discussed herein. The power application 110 as illustrated in FIG. 3A1 includes a plurality of power application wires 114 connected to a non-woven power application buss and/or electrode 112 by an adhesive layer 122. The power application 110 in FIG. 3A2 includes a plurality of power application wires 114 connected to a non-woven power application buss and/or electrode 112 by spots of adhesive 122.

Figure 3B:
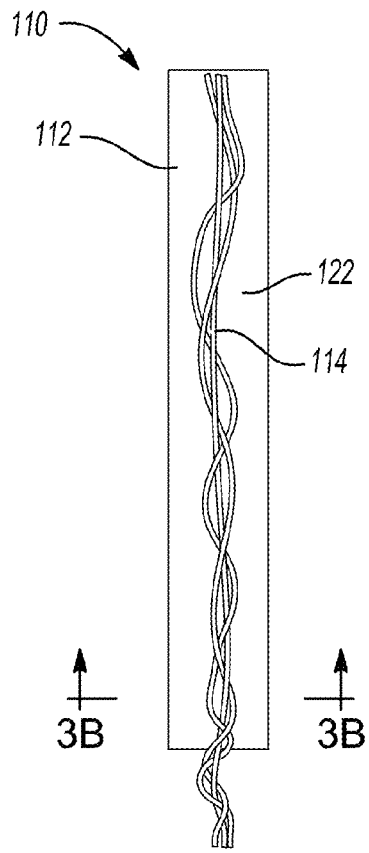
FIG. 3B illustrates a cross-section of the buss bar configuration of FIG. 3A1.
Figure 3B:
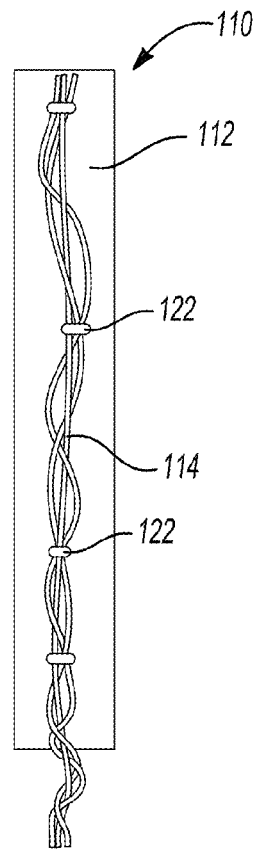
Figure 3B:
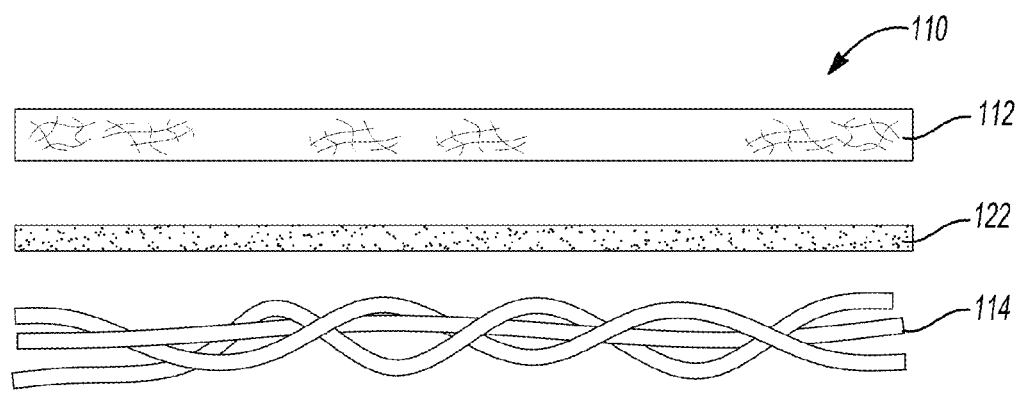

FIG. 3B illustrates an exploded cross sectional view of the power application 110 of FIG. 3A1. The power application 110 includes a non-woven power application buss and/or electrode 112 and a plurality of power application wires 114 that are connected by an adhesive layer 122 that also assists in connecting the power application 110 to a heating layer 120 (not shown).

Figure 4:
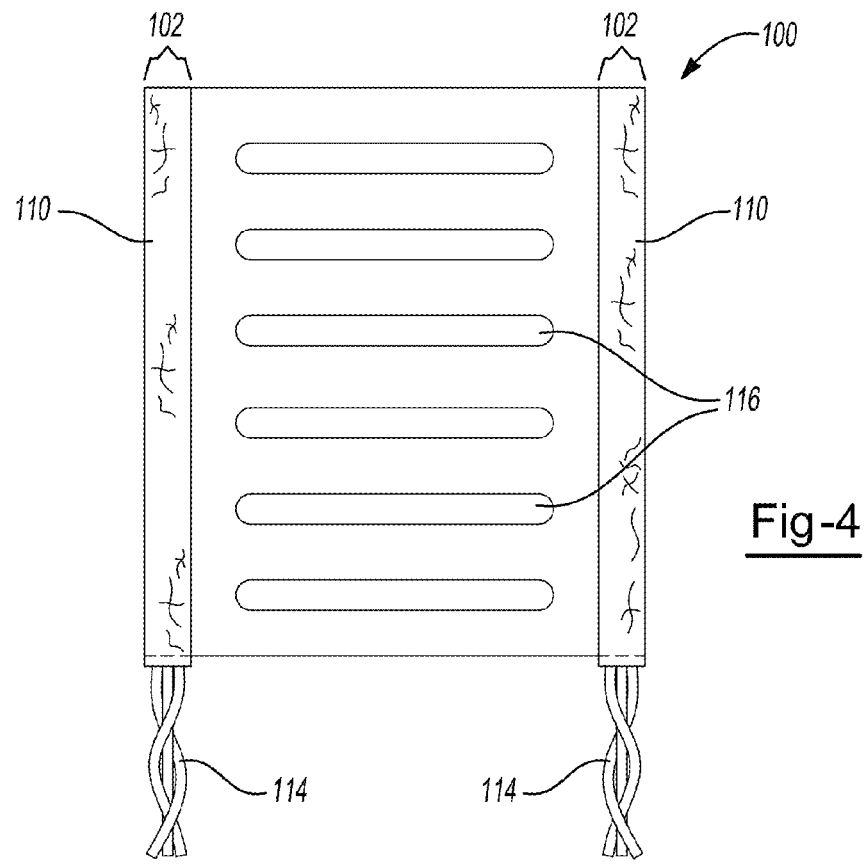
FIG. 4 illustrates another view of a heater taught herein.

FIG. 4 illustrates a heater 100 including a plurality of through holes 116 extending through the heater 100. Power applications 110 are located in the side edge regions 102 of the heater 100 on the sides of the heater 100. As illustrated, a plurality of power application wires 114 extend from the power applications 110. The through holes 116 form a ladder configuration along a length of the heater so that the resistance of the heater 100 is increased when compared to a heater 100 without the through holes 116.

Figure 5:
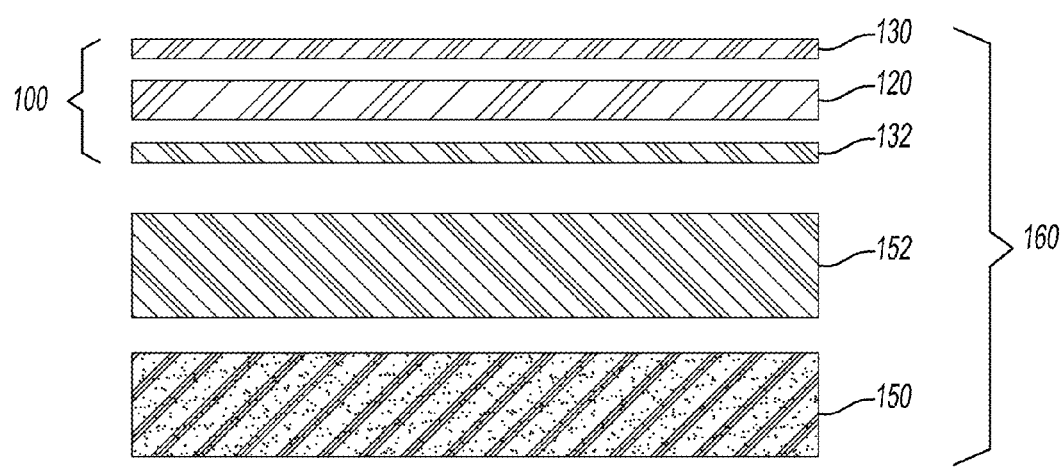
FIG. 5 illustrates a cross-sectional view of a heater installed in a ventilated and/or active heating and cooled vehicle seat.

FIG. 5 illustrates the heater 100 of the teachings herein incorporated into a heating and ventilation and/or cooling system 160. The heater as illustrated includes at least a rearward cover layer 130, a heating layer 120, and a rearward cover layer 132. The heater 100 is disposed on an insert 152 that is disposed on a vehicle seat 150.

Figure 6:
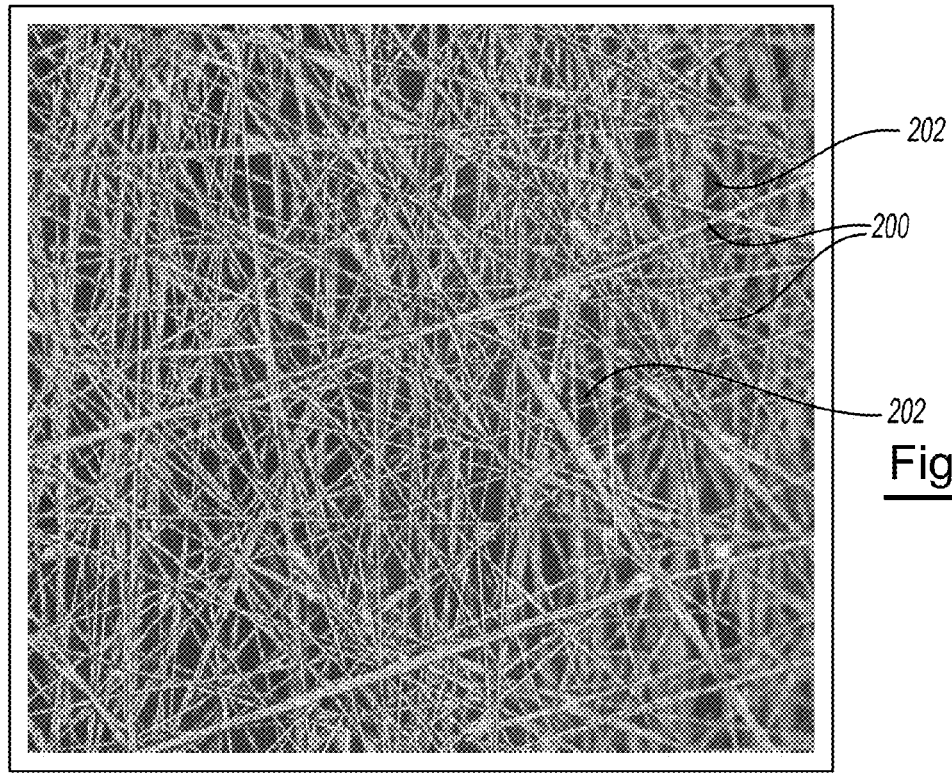
FIG. 6 illustrates a magnified view showing the randomness of the carbon fibers of the material of the teachings herein.

FIG. 6 illustrates one nonwoven carbon fiber material of the teachings herein magnified 50 times. As can be seen in the magnified view the fibers 200 are randomly oriented (i.e., the fibers all are aligned in different directions) and there are voids 202 between the fibers 200.

Figure 7:
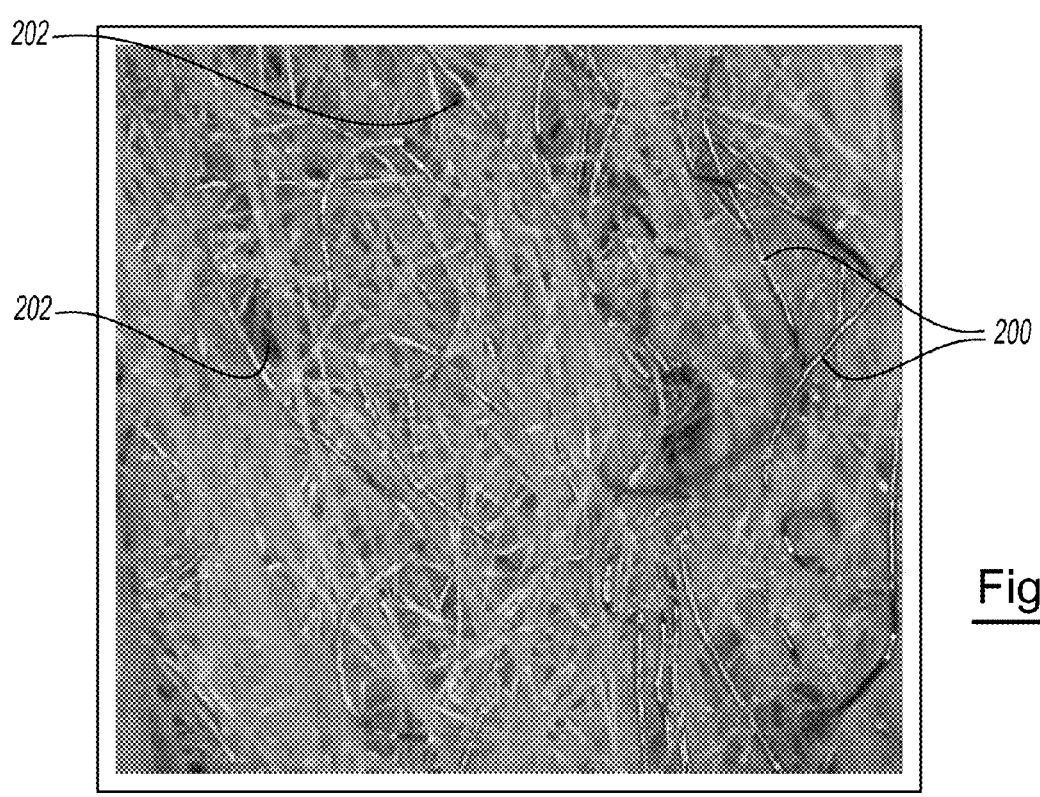
FIG. 7 illustrates a magnified view showing the randomness of hydroentangled metallized fibers.

FIG. 7 illustrates one nonwoven hydroentangled metallized fiber of the teachings herein magnified 50 times. As can be seen in the magnified view the fibers 200 are randomly oriented and there are voids 202 between the fibers 200.

Figure 8:
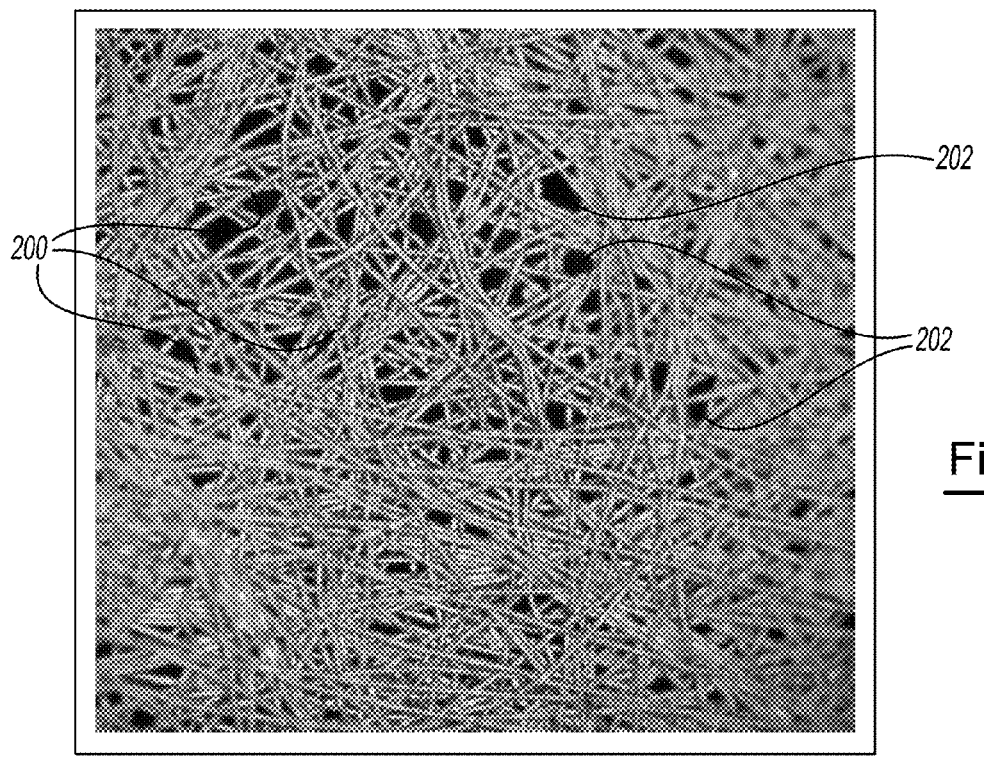
FIG. 8 illustrates a magnified view showing the randomness of dual coated metallized fibers.

FIG. 8 illustrates one nonwoven dual metallized fiber heating layer of the teachings herein magnified 50 times. As can be seen in the magnified view the fibers 200 are randomly oriented and there are voids 202 between the fibers 200.

Figure 9:
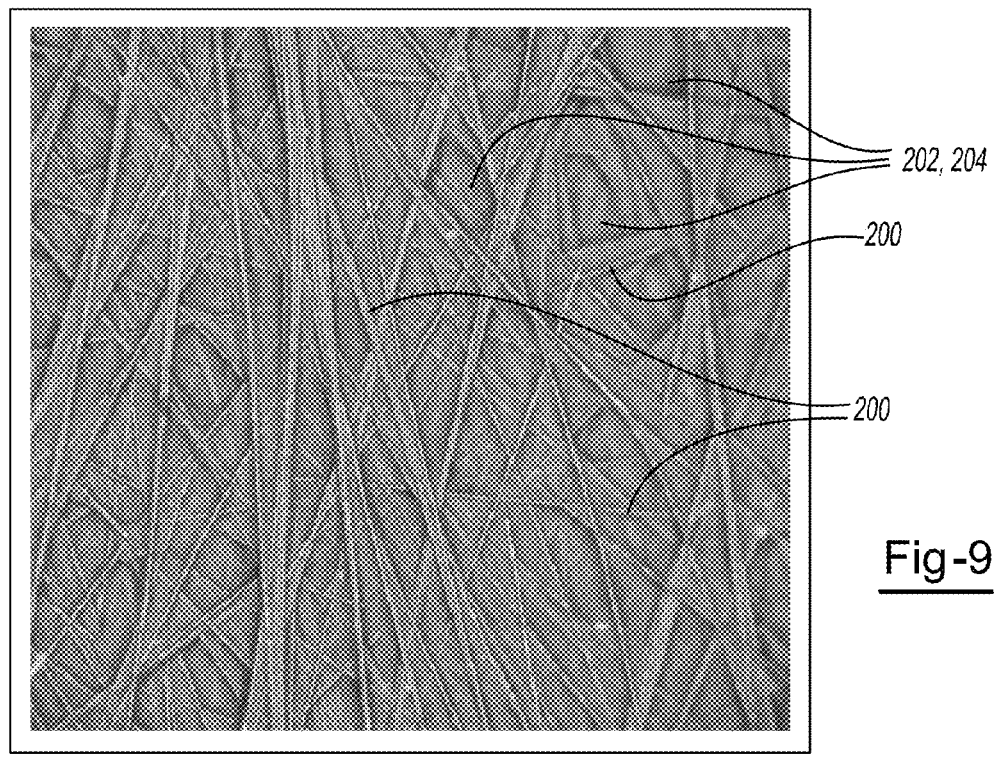
FIG. 9 illustrates a magnified view of fibers coated with a low viscosity protecting layer.
Figure 10:
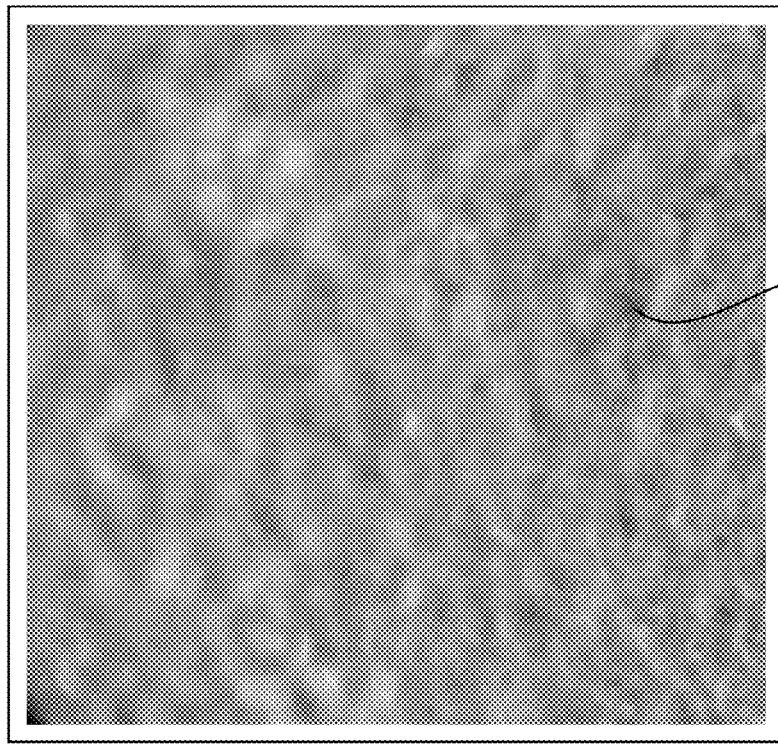
FIG. 10 illustrates a magnified view of fibers coated with a high viscosity protecting layer.

FIG. 9 illustrates one view of a nonwoven fiber heating layer coated with a low viscosity protective layer 204 of the teachings herein magnified 50 times. As can be seen in the magnified view the fibers 200 are randomly oriented and the fibers 200 are coated with the protecting layer 204, and the voids 202 are filled with the material of the protecting layer 204 so that the voids are closed FIG. 10 illustrates one view of a nonwoven fiber heating layer coated with a high viscosity protecting layer 204 of the teachings herein magnified 50 times. As can be seen in the magnified view the fibers 200 and voids 202 cannot be seen through the protecting layer 204.

Figure 11:
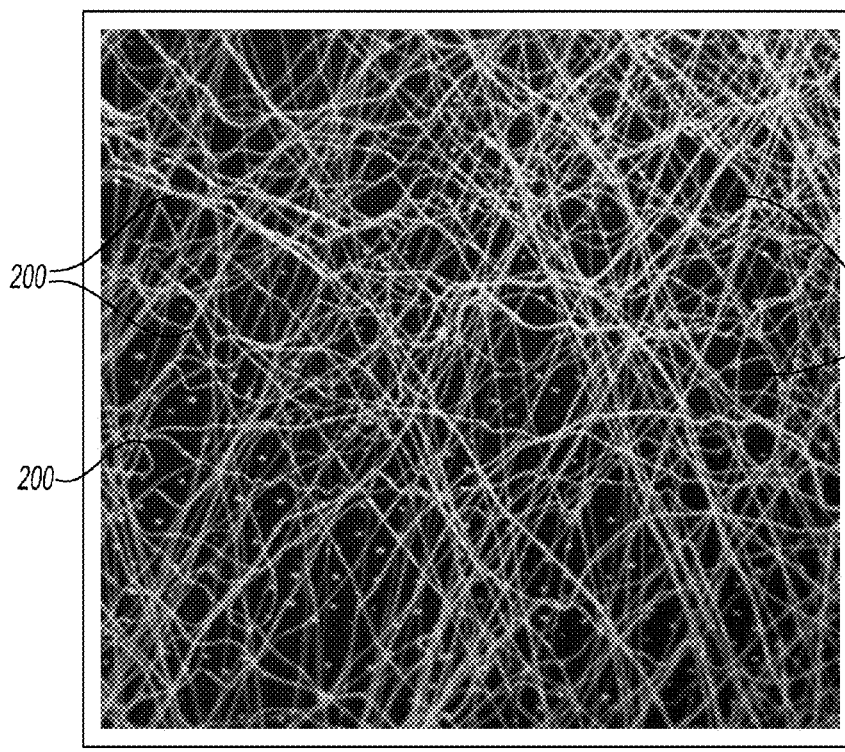
FIG. 11 illustrates a magnified view of a porous adhesive that may be used with the teachings herein.

FIG. 11 illustrates one view of an adhesive layer of the teachings herein magnified 50 times. As can be seen in the magnified view the adhesive layer includes fibers 200 that are randomly oriented and voids 202 between the fibers.

Additional aspects of the heater can be gleaned from the teachings herein including those of paragraph 0041, 0042, 0044; claims 1 through 26; and FIGS. 2-8 of Provisional Application Ser. No. 61/588,952, filed Jan. 20, 2012 incorporated by reference herein, which shows various alternative embodiments of the heater. Additional aspects of the method of producing a heater can be gleaned from the teachings herein including those of paragraph 0040; claims 27 through 32 and FIGS. 1A and 1B of Provisional Application Ser. No. 61/588,952, filed Jan. 20, 2012 incorporated by reference herein, which shows various alternative methods of producing a heater.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:
1. A heater comprising:
 a. a non-woven heating layer having:
  i. a plurality of individual fibers, made of carbon, that are randomly oriented;
  ii. a plurality of voids interspersed between the plurality of individual fibers that are randomly oriented, and
  iii. a plurality of edges around a periphery of the non-woven heating layer;
 b. two or more power applications connecting the heater to a power source; and
 c. one or more forward cover layers;
  wherein the two or more power applications are sandwiched between the non-woven heating layer and the one or more forward cover layers;
  wherein the non-woven heating layer produces heat when power is applied to the non-woven heating layer through the two or more power applications so that the heater has a uniform heating density;
  wherein the two or more power applications include:
   a. one or more wires sewn to the non-woven heating layer, the one or more wires extending along a length of the non-woven heating layer;
   b. a porous adhesive layer, having a forward surface and a rearward surface, covering the one or more wires that are in contact with the rearward surface of the porous adhesive layer, and
   c. a nonwoven power application buss or electrode disposed on the forward surface of the porous adhesive layer so that the one or more wires transfer power to the nonwoven power application buss or electrode disposed on the forward surface of the porous adhesive layer,
  wherein the one or more wires are both electrically and physically connected to the power source;
  wherein power is transferred to the non-woven heating layer by both the one or more wires and the nonwoven power application buss or electrode; and wherein the heater includes a forward adhesive layer so that the one or more forward cover layers are adhered directly to each of the two or more power applications; and
wherein the heater is configured to be laid over a cushion of a vehicle seat and under a trim cover.

2. The heater of claim 1,
wherein the plurality of individual fibers are connected by a binder and the binder is present in an amount from about 1 percent to about 20 percent; and
wherein the plurality of individual fibers, made of carbon are present in an amount from about 80 percent to about 99 percent.

3. The heater of claim 2, wherein the non-woven heating layer has a surface power density of about 300 W/m² or more to about 1000 W/m² or less.

4. The heater of claim 1, wherein an average fiber length of each of the plurality of individual fibers is about 40 mm or less.

5. The heater of claim 1, wherein the forward surface is covered by the one or more forward cover layers, and the rearward surface is covered by one or more rearward cover layers, or both; wherein the one or more forward cover layers, the one or more rearward cover layers, or both are made of a non-woven fleece, a woven fleece, a woven fabric, a polymeric material, or a combination thereof, that is applied by gluing, surface melting, or a combination thereof.

6. The heater of claim 1, wherein a protecting layer interpenetrates the non-woven heating layer filling all or a portion of the plurality of voids interspersed between the plurality of individual fibers so that the non-woven heating layer is strengthened; the forward surface, the rearward surface, or both are dielectric; porosity of the non-woven heating layer is reduced or eliminated; or a combination thereof.

7. The heater of claim 6, wherein the protecting layer does not entirely surround the plurality of individual fibers so that electrical connections between the plurality of individual fibers remain intact.

8. The heater of claim 1, wherein a material that forms a protecting layer has a viscosity of about 0.0035 Pa*s or more at 20° C. and the non-woven heating layer is dipped in the material, and the material of the protecting layer interpenetrates the plurality of voids and forms a dielectric coating over the entire heating layer.

9. The heater of claim 1, wherein the non-woven heating layer is free of any additives, deposited metals, deposited positive temperature coefficient materials, or a combination thereof that are deposited over a formed heating layer that assist in producing heat.

10. The heater of claim 1, wherein the heater is free of a stabilizing material, hermetic sealing, or both.

11. The heater of claim 1, wherein the heater is free of impregnated filling materials.

12. A seat heater comprising:
a. a non-woven heating layer having:
  i. a plurality of individual fibers, made of carbon, that are randomly oriented,
  ii. a plurality of voids interspersed between the plurality of individual fibers that are randomly oriented,
  iii. a forward surface,
  iv. a rearward surface, and
  v. a plurality of edges around a periphery of the non-woven heating layer;
b. one or more forward cover layers that extends at least partially or entirely over the forward surface;
c. one or more forward adhesive layers between the one or more forward cover layers and the forward surface of the non-woven heating layer that secure at least a portion of the one or more forward cover layers directly to the forward surface of the non-woven heating layer;
d. one or more rearward cover layers that extends at least partially or entirely over a rearward surface of the non-woven heating layer;
e. one or more rearward adhesive layers between the one or more rearward cover layers and the rearward surface of the non-woven heating layer that secure at least a portion of the one or more rearward cover layers directly to the rearward surface of the non-woven heating layer;
f. two or more power application layers including:
  i. two or more wires disposed on the forward surface or the rearward surface of the non-woven heating layer, the two or more wires being spaced apart and extending along an edge region of two or more edges of the plurality of edges of the non-woven heating layer, wherein each of the two or more edges includes a composite of wires that are interwoven together;
  ii. one or more attachment devices that are sewing that connect the two or more wires to the non-woven heating layer;
  iii. a porous adhesive layer, having a forward surface and a rearward surface, covering the two or more wires that are in contact with the rearward surface of the porous adhesive layer;
  iv. a nonwoven power application buss or electrode disposed on the forward surface of the porous adhesive layer so that the two or more wires transfer power to the nonwoven power application buss or electrode disposed on the forward surface;
wherein the two or more wires are both electrically and physically connected to a power source;
wherein power is transferred to the non-woven heating layer by both the two or more wires and the nonwoven power application buss or electrode;
wherein either the one or more forward cover layers and the one or more forward adhesive layers or the one or more rearward cover layers and the one or more rearward adhesive layers extend at least partially over the two or more power application layers so that the at least a portion of the one or more forward cover layers or the one or more rearward cover layers is adhered directly to the two or more power application layers;
wherein the one or more forward adhesive layers, the one or more rearward adhesive layers, or both directly covers the two or more power application layers so that a portion of the one or more forward cover layers, the one or more rearward cover layers, or both is connected to the two or more power application layers;
wherein a protecting layer impregnates the non-woven heating layer filling all or a portion of the plurality of voids interspersed between the plurality of individual fibers so that the non-woven heating layer is strengthened; the forward surface of the non-woven heating layer, the rearward surface of the non-woven heating layer, or both are dielectric; porosity of the non-woven heating layer is reduced or eliminated; or a combination thereof;
wherein the non-woven heating layer produces heat when power is applied to the non-woven heating layer;
wherein the seat heater is configured to be laid over a cushion of a vehicle seat and under a trim cover; and the non-woven heating layer has a resistivity from about 3Ω to about 7Ω.

13. The seat heater of claim 12, wherein the seat heater is connected to the cushion by an adhesive, a mechanical fastener, or both.

14. The seat heater of claim 12, wherein the non-woven heating layer is configured with one or more through holes.

15. The seat heater of claim 14, wherein the one or more through holes increase the resistivity of the non-woven heating layer.

16. The seat heater of claim 12, wherein the one or more forward adhesive layers, the one or more rearward adhesive layers, or both comprises an impregnating adhesive such that the one or more forward adhesive layers, the one or more rearward adhesive layers, or both are also the protecting layer.

17. A method of producing a seat heater comprising:
a. obtaining the non-woven heating layer of claim 1;
b. disposing the one or more wires along opposing edge regions of the non-woven heating layer;
c. applying a protecting layer that impregnates the non-woven heating layer filling all or a portion of the plurality of voids interspersed between the plurality of individual fibers so that the non-woven heating layer is strengthened; a forward surface of the non-woven heating layer, a rearward surface of the non-woven heating layer, or both are dielectric; porosity of the non-woven heating layer is reduced or eliminated; or a combination thereof
d. sewing the one or more wires to the non-woven heating layer;
e. disposing the porous adhesive layer over each of the one or more wires;
f. disposing a conductive non-woven strip over the porous adhesive layer;
g. attaching the conductive non-woven strip to the non-woven heating layer;
wherein the step of sewing and the step of attaching are performed at the same time, or the step of sewing is performed before the step of attaching.

18. The method of claim 17, wherein the method includes a step of disposing the one or more forward cover layers over the forward surface of the non-woven heating layer, disposing one or more rearward cover layers over the rearward surface of the non-woven heating layer, or both,
covering the two or more power applications with the forward adhesive layer so that the one or more forward cover layers are directly adhered to each of the two or more power applications, and
covering the two or more power applications with one or more rearward adhesive layers so that the one or more rearward cover layers are directly adhered to each of the two or more power applications.

19. The method of claim 17, wherein the one or more wires are each connected to the conductive non-woven strip before both are attached to the non-woven heating layer.

* * * * *